United States Patent [19]

Onoda

[11] Patent Number: 4,819,399
[45] Date of Patent: Apr. 11, 1989

[54] DEPLOYABLE TRUSS

[75] Inventor: Junjiro Onoda, 1986-10 Kanaimachi, Machida, Japan

[73] Assignees: Hitachi, Ltd., Tokyo, Japan; Junjiro Onoda, Machida, Japan

[21] Appl. No.: 17,629

[22] Filed: Feb. 24, 1987

Related U.S. Application Data

[63] Continuation of Ser. No. 786,830, Oct. 11, 1985, abandoned.

[30] Foreign Application Priority Data

Oct. 12, 1984 [JP] Japan .................... 59-214991
Oct. 15, 1984 [JP] Japan .................... 59-215967

[51] Int. Cl.$^4$ ............................................ E04H 12/18
[52] U.S. Cl. .................................... 52/646; 52/645
[58] Field of Search ............ 52/645, 646, 81, DIG. 10

[56] References Cited

U.S. PATENT DOCUMENTS

| | | | |
|---|---|---|---|
| 3,771,274 | 11/1973 | Vaughan | 52/646 X |
| 3,838,703 | 10/1974 | Zeigler | 52/645 X |
| 3,968,808 | 7/1976 | Zeigler | 52/81 X |
| 4,276,726 | 7/1981 | Derus | 52/646 X |
| 4,355,918 | 10/1982 | Van Vliez | 52/81 X |
| 4,471,548 | 9/1984 | Goudie | 52/646 X |
| 4,475,323 | 10/1984 | Schwartzberg et al. | 52/646 X |
| 4,522,008 | 6/1985 | Zeigler | 52/646 X |
| 4,543,761 | 10/1985 | Mockovciak, Jr. | 52/646 X |

OTHER PUBLICATIONS

NASA-CR-170690, Development of Deployable Structure for Large Space Platform Systems.
NASA-CP-2215, Part 1, pp. 179–192, Sequential Deployment of Truss Structure, Large Space Systems Technology.
NASA-CP-2269, Part 1, pp. 381–421, Survey of Deployable Antenna Concepts, Large Space antenna Systems Technology.
NASA-CP-2269, Part 1, pp. 513–525, Status of Deployable Tetrahydral Truss Reflector, Large Space Antenna Systems Technology.
NASA-CP-2368, Part 1, pp. 237–250, Syncronously Deployable Tetrahydral Truss Reflector, Large Space Antenna Systems Technology.
New Concepts for Precision Reflector Support Structures, Preprint for the 36th Congress of the International Astronautical Federation, Cot. 7-12, 1985.

Primary Examiner—Carl D. Friedman
Assistant Examiner—Creighton Smith
Attorney, Agent, or Firm—Antonelli, Terry & Wands

[57] ABSTRACT

A deployable truss composed of a plurality of three-dimensional truss units. Each said three-dimensional truss unit includes a plurality of ridge members located in the position of ridges of an imaginary substantial hexahedron having a front face, a rear face and four side faces, a plurality of side face diagonal members each located in the position of one of two diagonal lines of each side face of the hexahedron and having an articulated joint located in the intermediate position so as to be bendable, said side face diagonal members being oriented such that each member is not parallel to the diagonal member in the opposite side face and is connected to the same vertex as the diagonal member in the adjacent side face, and a front face diagonal member and a rear face diagonal member located in the position of one of two diagonal lines of the front face and in the position of one of two diagonal lines of the rear face, respectively, and each having an articulated joint in the intermediate position so as to be bendable. The three-dimensional truss units are oriented and joined together in such a manner that each unit shares with the adjacent unit one side face of the hexahedron and the ridge members and side face diagonal member in said one side face, and the side face diagonal members of each unit are essentially in mirror-image relation to the corresponding members of the adjacent unit with respect to the shared one side face. The diagonal members and ridge members of each said three-dimensional truss unit are dimensioned such that the lengths thereof satisfy a predetermined geometrical condition which enables each unit to be folded and allows same to maintain the geometrical configuration, whereby the deployable truss can be folded to occupy a small space by bending all the diagonal members and can be deployed by straightening all the diagonal members.

6 Claims, 32 Drawing Sheets

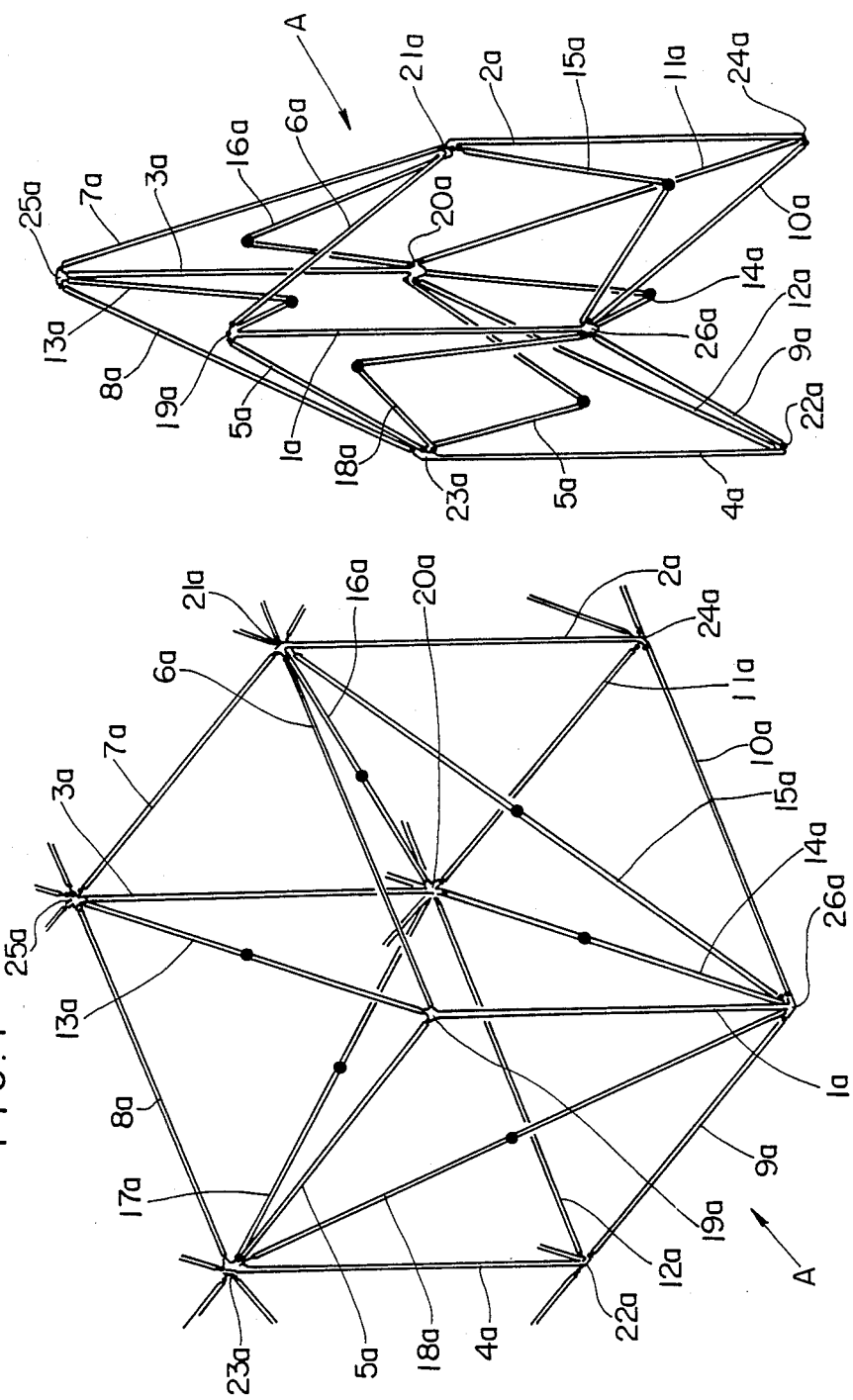

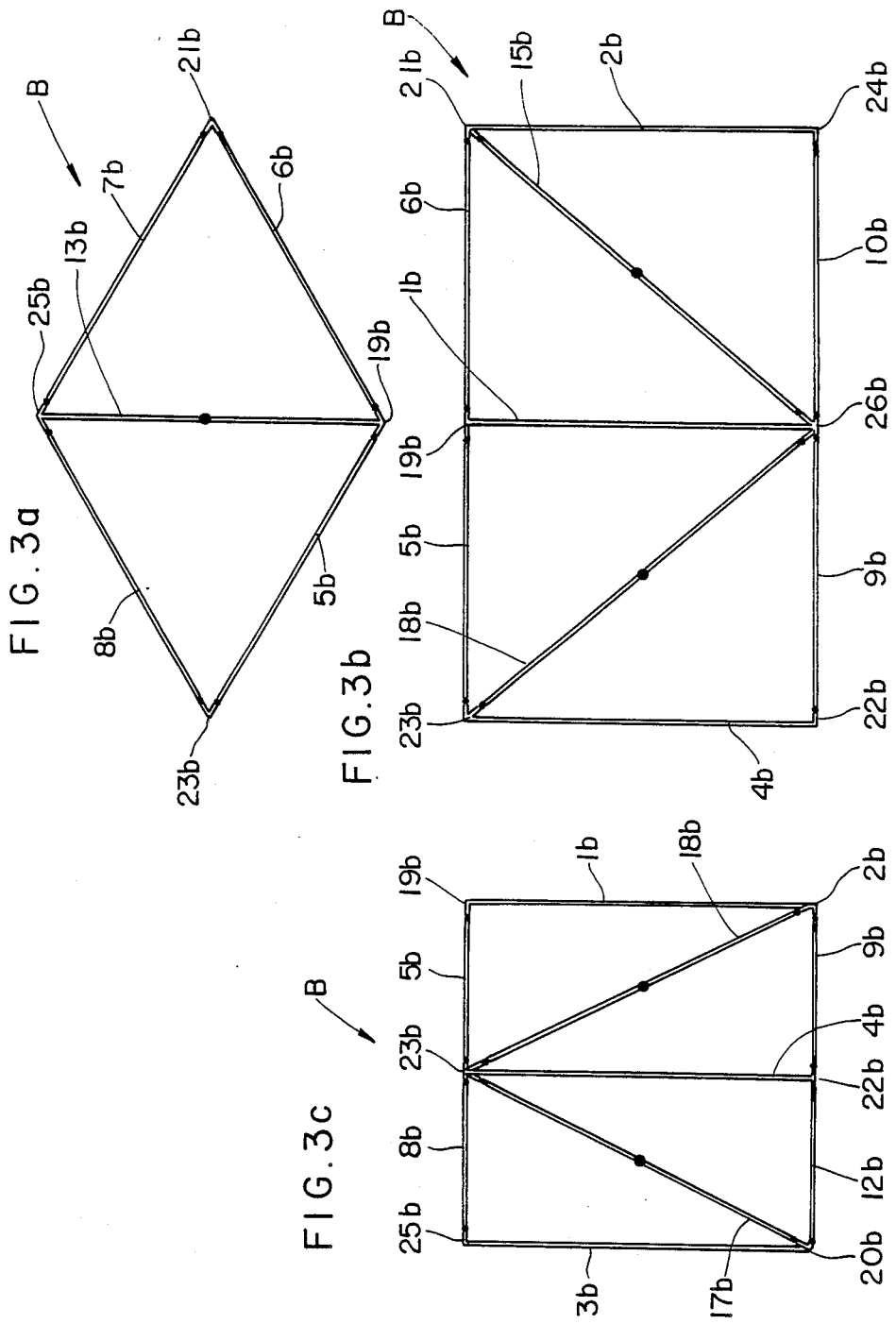

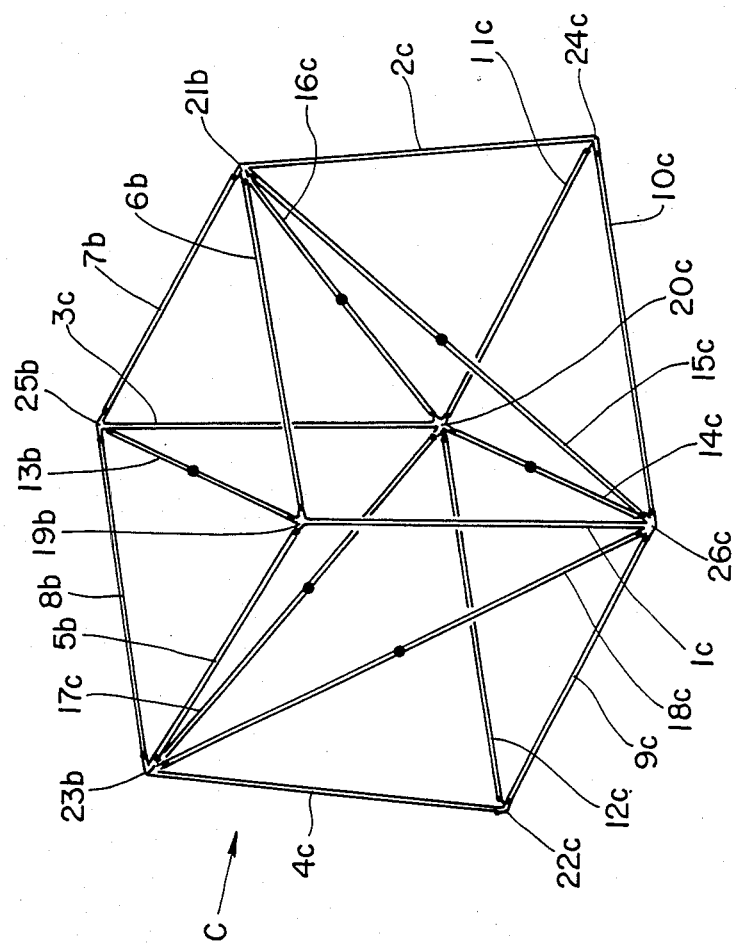

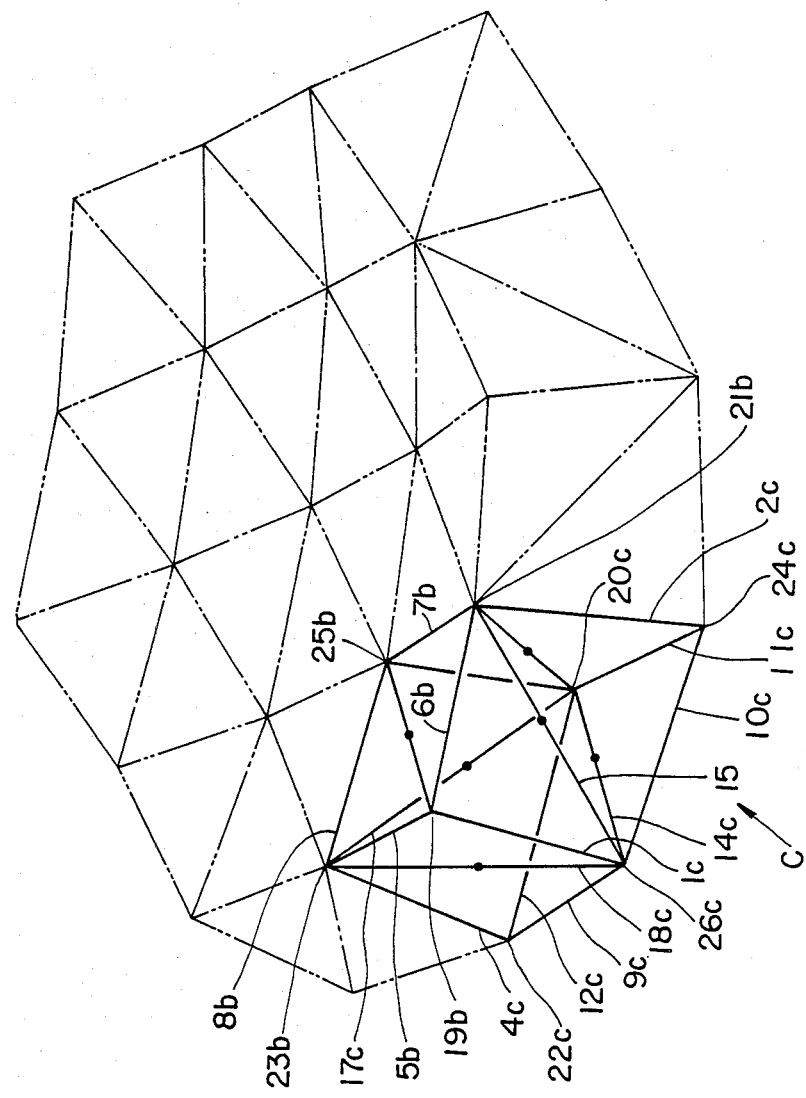

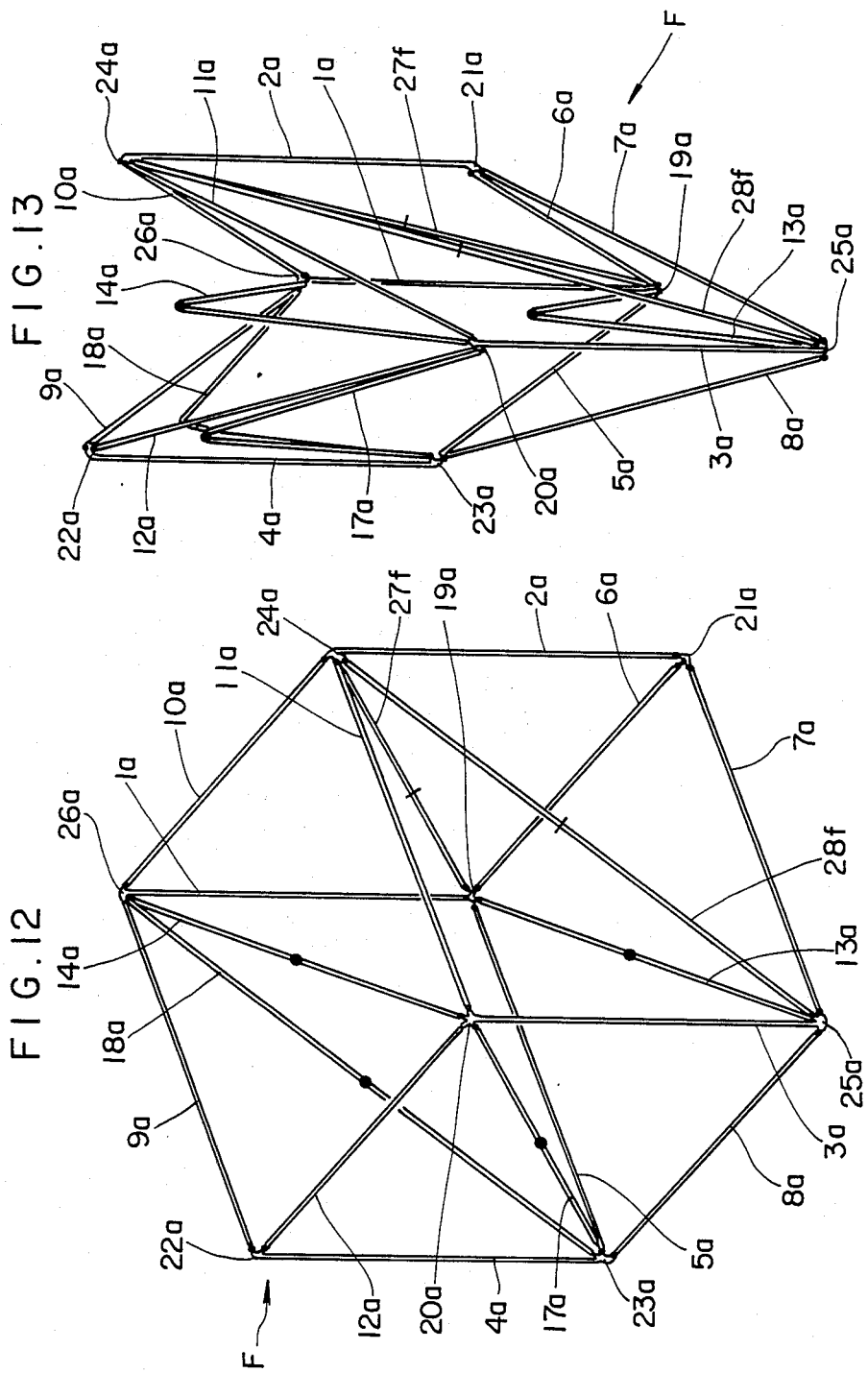

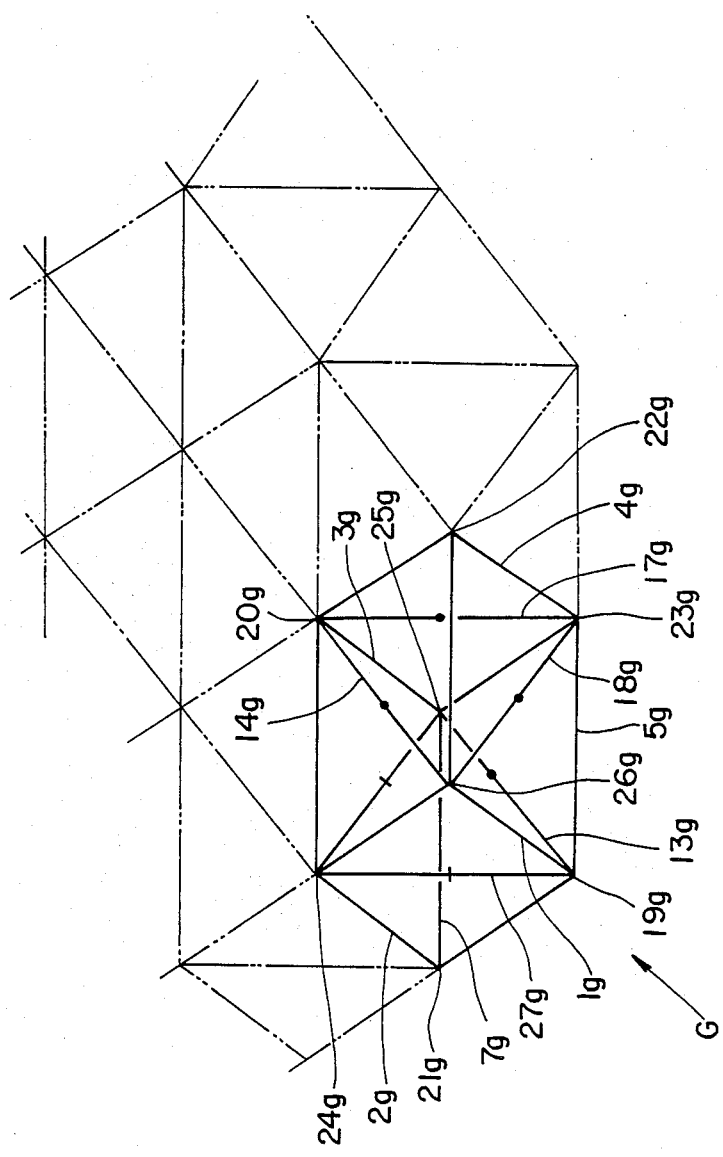

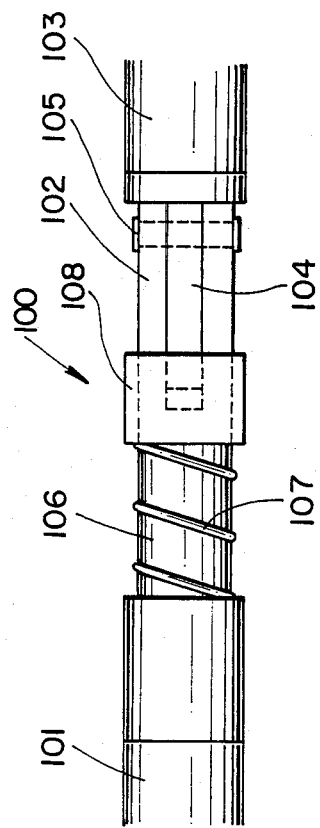
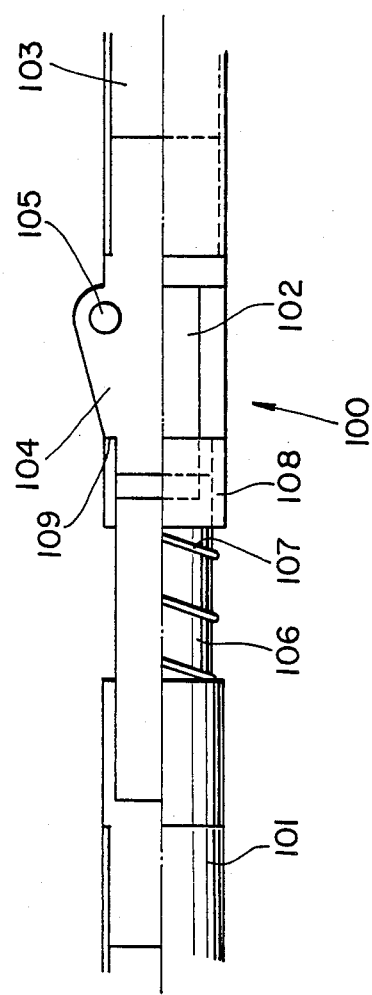

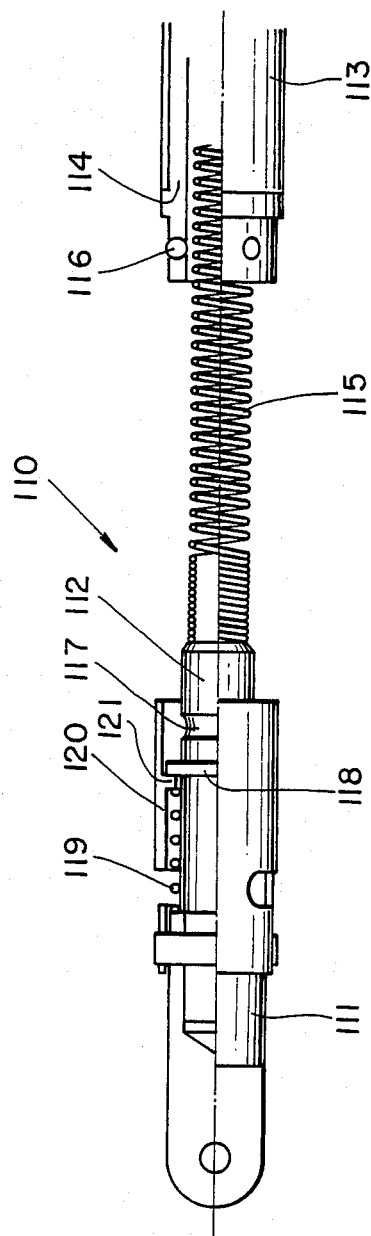

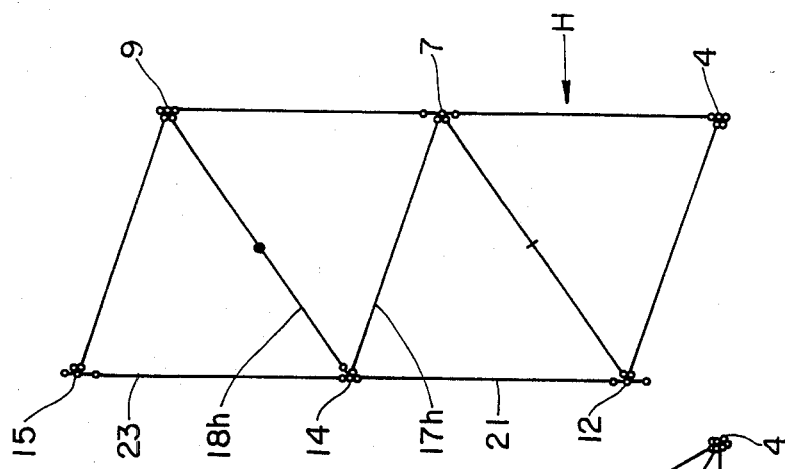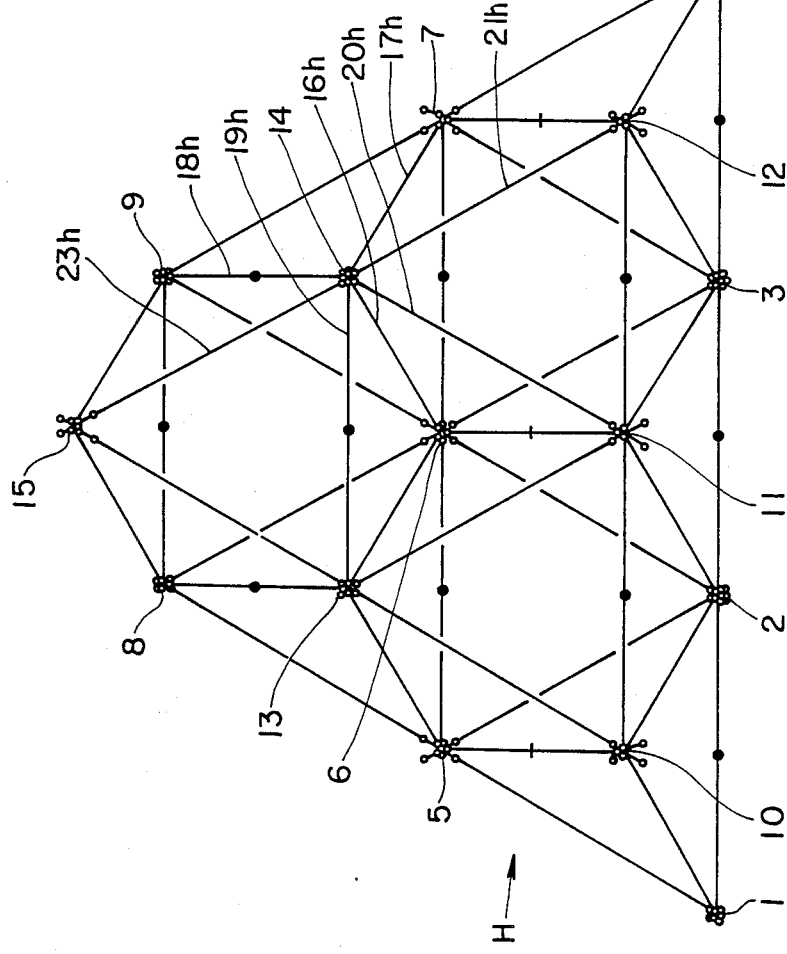

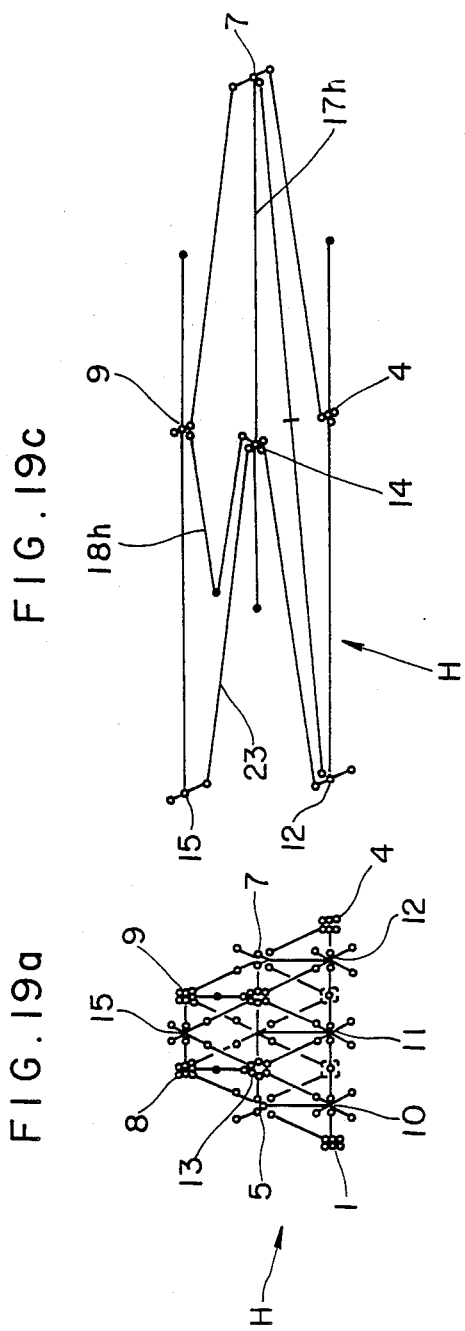

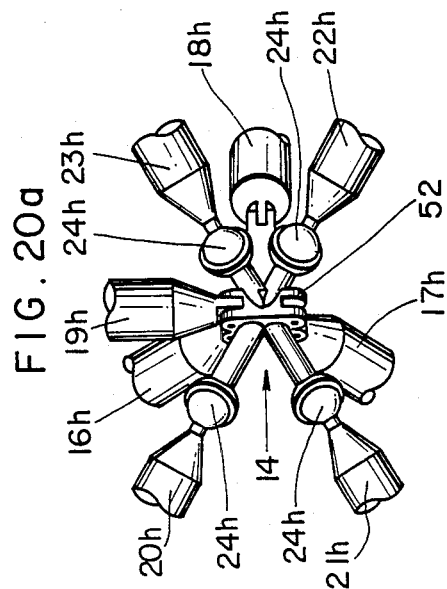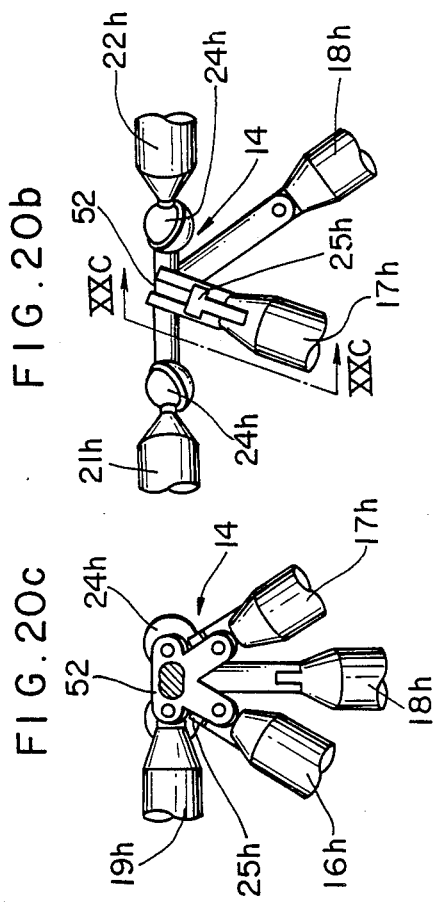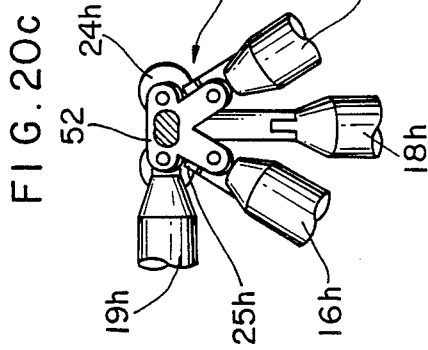

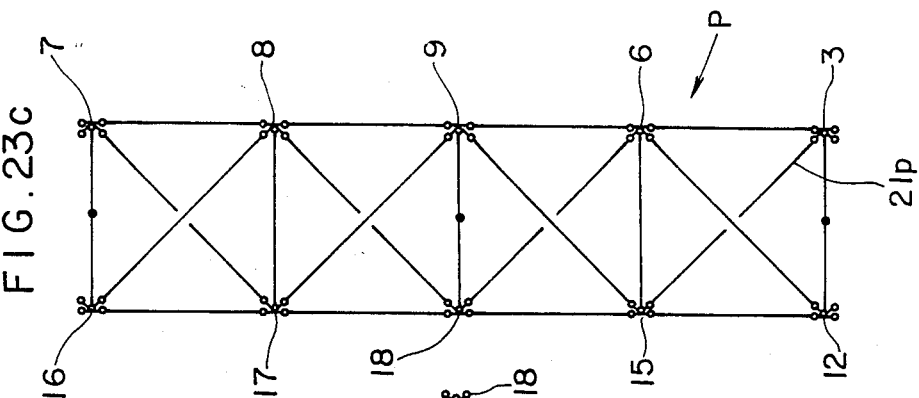
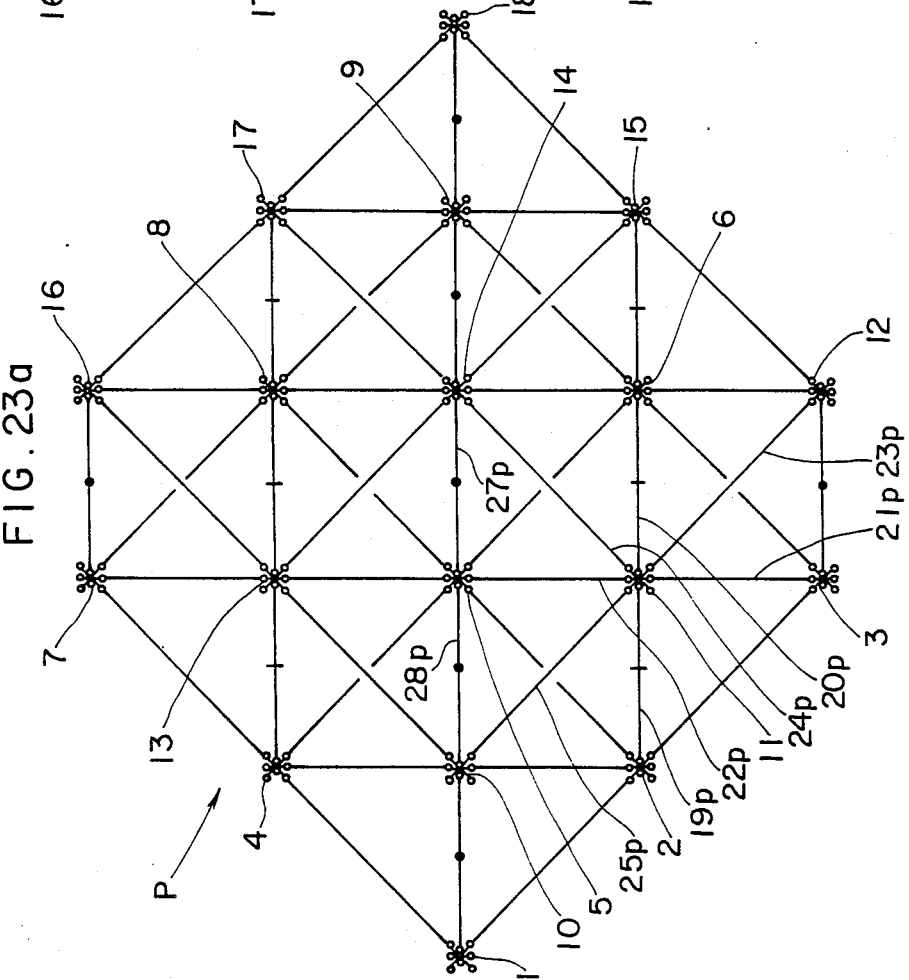

DEPLOYABLE TRUSS

This is a continuation of application Ser. No. 786,830, filed Oct. 11, 1985, now abandoned.

FIELD OF THE INVENTION AND RELATES ART STATEMENT

This invention relates to deployable trusses capable of forming a truss structure which occupies a small space when folded and provides a macroscopic two-dimensional structure or one-dimensional structure when deployed, and more particularly it is concerned with a deployable truss which facilitates the construction of medium- and large-sized truss structures in outer space and enables the operation of constructing such structures to be performed with a high degree of efficiency.

The deployable truss according to this invention is suitable for use in constructing medium- and large-sized structures in outer space, or more specifically it can be utilized in building medium- and large-sized space structures for space colonies, solar power generating satellites, large-sized antennae, space bases, etc. However, the deployable truss according to the invention is not limited to this specific use in outer space, and its serves the purpose of building portable temporary structures on the earth.

Materials for building structures in outer space are transported from the earth. Thus, they should meet the following requirements:

(1) They should be light in weight as much as possible.

(2) They shoould be of a size which permits them to be carried by means of transportation from the earth to outer space, such as spacecraft or space shuttles propelled into outer space by rockets.

(3) They should be able to be closely and firmly put together by making the best use of available space when placed in a case for transportation.

(4) They could be assembled with ease when a structure is built in outer space.

(5) Structures built by using them should be high in stiffness.

Truss structures are considered to be most desirable as large-sized structures to be built in outer space. Proposals have been made to use nestable columns to achieve the desired compactness in size for transportation. However, difficulty would be experienced in assembling this type of truss members in outer space. It is presumed that, although robots would be used, man would be required to take part in building operations at great risk. This has directed the attention of those interested in space development to the use of deployable structures that can be transported to outer space in a folded state, although compactness should be sacrificed to a certain extent, and deployed automatically or semiautomatically in outer space. As a result, several proposals have been made to employ deployable structures, mainly one-dimensionally deployable structures. Typical of these structures is a structure disclosed in Japanese Patent Examined Publication No. 26653/74 which has a trade name ASTROMAST. Deployable trusses of the prior art are mostly of the type which is composed of truss members that can be bent at articulated joints.

Typical of two-dimensionally deployable structures is one which is generally referred to as a deployable GEO-TRUSS or tetrahedral truss which is composed of substantially regular tetrahedral truss units and substantially regular octahedral truss units arranged in a flat or curved plane when they are deployed. Each truss unit is folded by bending its members substantially in the middle thereof at both macroscopic front and rear faces of the deployable truss. Details of the GEO-TRUSS are described in the following report in the literature: J.A. Fager, Status of Deployable GEO-TRUSS Development, NASA CP-2269 Part 1, Large Space Antenna Systems Technology—1982.

It is to be noted that, in many deployable trusses including the GEO-TRUSS referred to hereinabove and one-dimensionally deployable trusses, truss members of front and rear faces on which forces are concentrated are each bent and straightened at an articulated joint located substantially in the middle of each truss member which is most important from the standpoint of Euler buckling load, so as to fold and deploy the truss. The provision of each truss member with an articulated joint substantially in the middle thereof would inevitably cause a decrease in stiffness and an increase in misalignments, thereby causing a reduction in the buckling strength and other strength of the structure. Besides, the use of the articulated joints would naturally increase the number of parts and the weight of the structure. Thus, the provision of a deployable truss in which the number of articulated joints is minimized has been earnestly desired. Particularly, a deployable truss in which the number of truss members of high importance from the standpoint of dynamics that are bent is minimized has been pined for.

SUMMARY OF THE INVENTION

This invention has as one of its objects the provision of a deployable truss which has a smaller number of articulated joints than deployable trusses of the prior art.

Another object is provided a deployable truss capable of minimizing the number of the truss members which require manipulation such as bending and elongation and might cause a reduction in the strength of the structure with respect to the truss members which are important from the standpoint of dynamics.

According to one aspect of the invention, there is provided a deployable truss comprising: (a) a plurality of three-dimensional truss units; (b) each said three-dimensional truss unit including: a plurality of ridge members located in the position of ridges on an imaginary substantial hexahedron having a front face, a rear face and four side faces; a plurality of side face diagonal members each located in the position of one of two diagonal lines of each side face of the hexahedron and having an articulated joint in the intermediate position so as to be bendable, said side face diagonal members being arranged such that each member is not parallel to the diagonal member in the opposite side face and is connected to the same vertex as the diagonal member in the adjacent side face, and a diagonal member of the front face and a diagonal member of the rear face located in the position of one of two diagonal lines of the front face and in the position of one of two diagonal lines of the rear face, respectively, said diagonal members of the front face and rear face each having a joint in the middle so as to be bendable; (c) each said three-dimensional truss unit sharing with an adjacent three-dimensional truss unit one side face of the hexahedron and the ridge members and diagonal member of side face, and the diagonal members of the side faces of the truss units being oriented and joined together in such a manner that they are in mirror image relation to the corresponding members of the shared side face; and (d) each said three-dimensional truss unit being dimensioned such that said diagonal members and ridge members have a length which enables the three-dimensional truss unit to be folded and allows a predetermined geometrical condition to be satisfied to maintain the deployable truss in the desired geometrical shape and configuration when deployed, whereby the deployable truss can be brought to a folded position to occupy a small space by bending all the diagonal member and can be brought to a deployed position by straightening all the diagonal members.

According to the invention, there is also provided a deployable truss comprising a plurality of three dimensional truss units, (a) each said three-dimensional truss unit comprising a plurality of ridge member located in the position of ridges of an imaginary substantial hexahedron having a front face, a rear face and four side faces, said ridge members being able to be elongated when they are not located in the front face and rear face, a plurality of diagonal members of the side faces each located in the position of one of two diagonal lines of each side face of the truss unit, said diagonal members of the side faces being oriented such that they are not parallel to each other when they are located in the opposite side faces and they are connected to the same vertex when they are located in the adjacent side faces, and a plurality of diagonal members of the front face and rear face, each of said diagonal member of the front face and rear face being located in the position of one of two diagonal lines and having a joint located in the middle so as to be bendable; (b) each said three-dimensional truss unit sharing with an adjacent three dimensional truss uint one side face of the hexahedron and the ridge members and diagonal members of said side face, and the diagonal members of the side faces of the truss units being oriented and joined together in such a manner that they are in mirror image relation to the corresponding members of the shared side face; and (c) each said three-dimensional truss unit being dimensioned such that said diagonal members and ridge members have a length which enables the three-dimensional truss unit to be folded and allows a predetermined geometrical condition to be satisfied to maintain the deployable truss in the desired geometrical shape and configuration when deployed, whereby the deployable truss can be brought to a folded position to occupy a small space by bending the diagonal members of the front face and rear face and elongating the ridge members not located in the front face and connected to the same vertex as the diagonal member in the adjacent side face; and a front face diagonal member and a rear face diagonal member located in the position of one of two diagonal lines of the front face and in the position of one of two diagonal lines of the rear face, respectively, and each having an articulated joint in the intermediate position so as to be bendable; (d) said three-dimensional truss units being oriented and joined together in such a manner that each unit shares with the adjacent unit one side face of the hexahedron and the ridge members and side face diagonal member in said one side face, and the side face diagonal members of each unit are essentially in mirror-image relation to the corresponding members of the adjacent unit with respect to the shared one side face; and (e) said diagonal members and ridge members of each said three-dimensional truss unit being dimensioned such that the lengths thereof satisfy a predetermined geometrical condition which enables each unit to be folded and allows same to maintain the geometrical configuration, whereby the deployable truss can be folded to occupy a small space by bending all the diagonal members and can be deployed by straightening all the diagonal members.

According to another aspect of the invention, there is provided deployable truss comprising: (a) a plurality of three-dimensional truss units; (b) each said three-dimensional truss unit including: a plurality of ridge members located in the position of ridges of an imaginary substantial hexahedron having a front face, a rear face and four side faces, those of said ridge members which are not located in the front face and rear face being able to be elongated; a plurality of side face diagonal members each located in the position of one of two diagonal lines of each side face of the hexahedron, said side face diagonal members being oriented such that each member is not parallel to the diagonal member in the opposed side face and is connected to the same vertex as the diagonal member in the adjacent side faces; and a front face diagonal member and a rear face diagonal member located in the position of one of two diagonal lines of the front face and in the position of one of the two diagonal lines of the rear face, respectively, and each having an articulated joint located in the intermediate position so as to be bendable; (c) said three-dimensional truss units being oriented and joined together in such a manner that each unit shares with the adjacent unit one side face of the hexahedron and the ridge members and side face diagonal member of said one side face, and the side face diagonal members of each unit are in mirror-image relation to the corresponding members of the adjacent unit with respect to the shared one side face; and (d) said diagonal members and ridge member of each said three-dimensional truss unit being dimensioned such that the lengths thereof satisfy a predetermined geometrical condition which enables each unit to be folded and allows same to maintain the geometrical configuration, whereby the deployable truss can be folded to occupy a small space by bending the front face and rear face diagonal members and elongating the ridge members which are not located in the front face and rear face and can be deployed by straightening the bent diagonal members and restoring the elongated ridge members to the original length.

According to further aspect of the invention, there is provided the deployable truss of the first aspect, wherein at least one of said side face diagonal members of each said three-dimensional truss unit is replaced by a side face diagonal member adapted to be able to be elongated and located in the position of the other diagonal line, whereby the deployable truss can be folded to occupy a small space by bending and elongating all the corresponding diagonal members and can be deployed by restoring all the diagonal members to the original position.

According to still further aspect of the invention, there is provided a deployable truss comprising: (a) a plurality of tetrahedral truss units; (b) said tetrehedral truss units being joined together to provide a three-dimensional truss structure such that when nodes of the truss structure are denoted by (i, j, k) wherein i and j are arbitrarily selected integers 0, 1, 2 ... and k is 0 and 1, a node (i, j, 0) and a node (i+1, j, 0), a node (i+1, j, 0) and a node (i, j+1, 0), a node (j, j+1, 0) and a node (i, j, 0), a node (i, j, 0) and a node (i, j, 1), a node (i, j, 1) and a node (i, j+1, 0), a node (i, j, 1) and a node (i+1, j, 0), a node (i, j, 1) and a node (i+1, j, 1), a node (i, j, 1) and a node (i, j+1, 1), and a node (i+1, j, 1) and a node (i, j+1, 1) are each connected together by a truss member with regard to all the values of i and j in a zone in which the truss structure exists when deployed; (c) the truss members connecting the node (i, j, 0) and the node (i+1, j, 0) and the truss members connecting the node (i, j, 1) and the node (i+1, j, 1) each having an articulated joint located in the intermediate position so as to be bendable, the truss members connecting the node (i, j, 1) and the node (i, j+1, 0) in which j is an odd number being able to be shortened and the truss members connecting the node (i, j, 1) and the node (i, j+1, 0) in which j is an even number being able to be elongated, 0 being considered as an even number; and (d) said truss members being dimensioned such that the lengths thereof satisfy a predetermined geometrical condition which enables the truss structure to be folded and allows some to maintain the geometrical configuration, whereby the truss structure can be folded to occupy a small space by bending, shortening and elongating the corresponding truss members and can be deployed by manipulating those truss members in a reversed process.

According to still further aspect of the invention, there is provided a deployable truss comprising: (a) a plurality of pentahedral truss units: (b) said pentahedral truss units being joined togther to provide a three-dimensional truss structure such that, when nodes of the truss structure are denoted by (i, j, k) wherein i and j are arbitrarily selected integers 0, 1, 2 ... and k is 0 and 1, a node (i, j, 0) and a node (i+1, j, 0), a node (i, j, 0) and a node (i, j+1, 0), a node (i, j, 0) and a node (i, j, 1), a node (i+1, j, 0) and a node (i, j, 1), a node (i, j, 1) and a node (i, j+1, 0), a node (i, j, 1) and a node (i+1, j+1, 0), a node (i, j, 1) and a node (i+1, j, 1), and a node (i, j, 1) and a node (i, j+1, 1) are each connected together by a truss member with regard to all the values of i and j in a zone in which the truss structure exists when deployed; (c) the truss members connecting the node (i, j, 0) and the node (i, j, 1) and the truss members connecting the node (i, j, 1) and the node (i+1, j+1, 0) in which i+j is an odd number being able to be elongated and the truss members connecting the node (i, j, 0) and the node (i, j, 1) and the truss members connecting the node (i, j, 1) and the node (i+1, j+1, 0) in which i+j is an even number being able to be shortened, 0 being considered to be an even number; and (d) said truss members being dimensioned such that the lengths thereof satisfy a predetermined geometrical condition which enables the truss structure to be folded and allows same to maintain the geometrical configuration, whereby the truss structure can be folded to occupy a small space by elongating and shortening the corresponding truss members and can be deployed by manipulating those truss members in a reversed process.

Additional and other objects, features and advantages of the invention will become apparent from the following description of the preferred embodiments when taken in conjunction with the accompanying drawings.

BRIEF DESCRIPTION OF THE DRAWINGS

FIG. 1 is a perspective view of a three-dimensional truss unit of the deployable truss comprising a first embodiment of the invention, showing the truss unit in a deployed position;

FIG. 2 is a perspective view of the three-dimensional truss unit shown in FIG. 1, showing the truss unit in half-folded position;

FIGS. 3a–3c are a plan view, a front view and a side view, respectively, of a modification of the three-dimensional truss unit of the first embodiment shown in FIG. 1, showing the truss unit in a deployed position;

FIG. 7 is a perspective view of the three-dimensional truss unit developed from the modification of the three-dimensional truss unit shown in FIGS. 3a–3c to build a three-dimensional truss structure in the form of a macroscopic curved surface, showing the three-dimensional truss unit in a deployed position;

FIG. 8 is a perspective view of the three-dimensional truss structure in the form of a macroscopic curved surface composed of a multiplicity of three-dimensional truss units like the three-dimensional truss unit shown in FIG. 7;

FIG. 12 is a perspective view of a three-dimensional truss unit of the deployable truss comprising a third embodiment, showing the truss unit in a deployed position;

FIG. 13 is a perspective view of the three-dimensional truss unit shown in FIG. 12, showing the truss unit in a half-folded position;

FIG. 14 is a perspective view of a three-dimensional truss structure composed of a multiplicity of three-dimensional truss units like the three-dimensional truss unit shown in FIG. 12 and in the form of a macroscopic flat surface;

FIGS. 15a and 15b are a plan view and a side view, respectively, of the joint having lock means which is one example of the joints used with the bendable truss members of the deployable truss according to the invention;

FIG. 16 is a side view, with certain parts being shown in section, of the elongation mechanism having lock means which is one example of the elongation mechanisms of the expandable truss members of the deployable truss according to the invention;

FIGS. 17a–17c are a plan view, a front view and a side view, respectively, of a portion of the deployable truss comprising a fourth embodiment for providing a three-dimensional truss structure in the form of a macroscopic flat surface, said portion being composed of members joined together by fifteen node;

FIGS. 19a-19c are a plan view, a front view and a side view, respectively, of the portion of the deployable truss according to the invention shown in FIGS. 18a-18c, showing the portion in a position in which it is further folded in a second direction and the folding operation is substantially finshed;

FIGS. 20a-20c are a plan view, a front view and a sectional side view taken along the line XXc—XXc in FIG. 20b, respectively, of the hinge block used with the deployable truss shown in FIG. 17a-17c;

FIGS. 23a-23c are a plan view, a front view and a side view, respectively, of a portion of the deployable truss comprising a fifth embodiment for providing a three-dimensional truss structure in the form of a macroscopic flat surface, showing the portion in a substantially folded position;

DESCRIPTION OF THE PREFERRED EMBODIMENTS

Figure 4A:
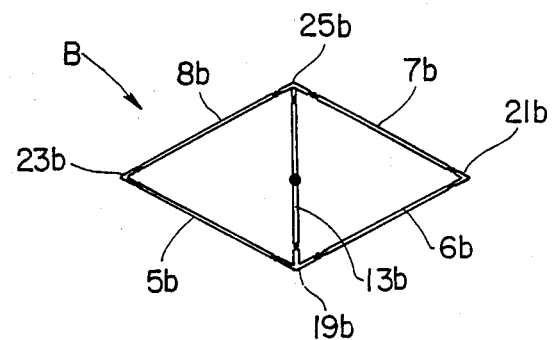
FIGS. 4a–4c are a plan view, a front view and a side view, respectively, of the modification of the three-dimensional truss unit shown in FIGS. 3a–3c, showing the truss unit in a half-folded position.

A first embodiment of the invention will be described by referring to FIGS. 1 and 2. A deployable truss comprising the first embodiment is composed of a plurality of three-dimensional truss units A, one of which is shown in FIG. 1. The three-dimensional truss unit A comprises ridge members 1a-12a each located in one of the ridges of an imaginary rectangular parallelepiped having a front face, a rear face and four side faces, and diagonal members 13a-18a each located in one of two positions of the diagonal lines of each side face. The diagonal members 13a k and 14a in the front and rear faces are located parallel to each other, and the diagonal members 15a-18a in the side faces are located such that those located in the opposed side faces are not parallel to each other while those located in the adjacent side faces are connected to each other at the same vertex. All the diagonal members 13a-18a each have an articulated joint located substantially in the middle of each of the diagonal members 13a-18a as indicated by a black ball (●) so that each diagonal member can be bent at the articulate joint.

The three-dimensional truss unit A shown in FIG. 1 can be folded into an intermediate position shown in FIG. 2 by bending all the diagonal members 13a-18a at the respective articulated joints. In FIG. 2, the ridge members 1a and 3a and ridge members 2a and 4a are shown as having moved in parallel toward each other to thereby allow folding of the truss unit. At this time, the ridge members 2a and 4a and the ridge members 1a and 3a have moved downwardly and upwardly, respectively, in the plane of FIG. 1. As the three-dimensional truss unit A is further folded, the ridge members 1a and 3a and ridge members 2a and 4a further move toward each other until they are folded into a single line when the members all have a thickness which is infinitely small as in an imaginary case.

The deployable truss comprising the first embodiment is constructed by arranging a plurality of three-dimensional truss units A in one macroscopic plane. More specifically, the plurality of three-dimensional truss units A are joined together in such a manner that the two adjacent three-dimensional truss units A share one side face of the imaginary rectangular parallelepiped and the ridge members and diagonal members in such one side face the diagonal members located in the rest of the side faces are essentially in mirror-image relation to the corresponding members of the adjacent unit with respect to the shared one side face, to thereby provide a three-dimensional truss structure in the form of a macroscopic flat surface.

The deployable truss composed of the three-dimensional truss units A as described hereinabove is provided by arranging in truss units A in such a manner that the diagonal members in the side faces of the adjacent two units A are in mirror-image relation, and therefore the units A alter their shape also in mirror image relation as the truss is folded, so that the three-dimensional truss units A in the form of a macroscopic flat surface formed by arranging a plurality of truss units A shown in FIG. 1 in one plane.

The diagonal members 13a and 14a of the front and rear faces are shown and described as being located parallel to each other. However, this arrangement is not restrictive, and they may be located in any direction in which they are not parallel to each other. Of course, the truss unit A can be folded even if the diagonal members 13a and 14a are not parallel to each other.

Figure 4C:
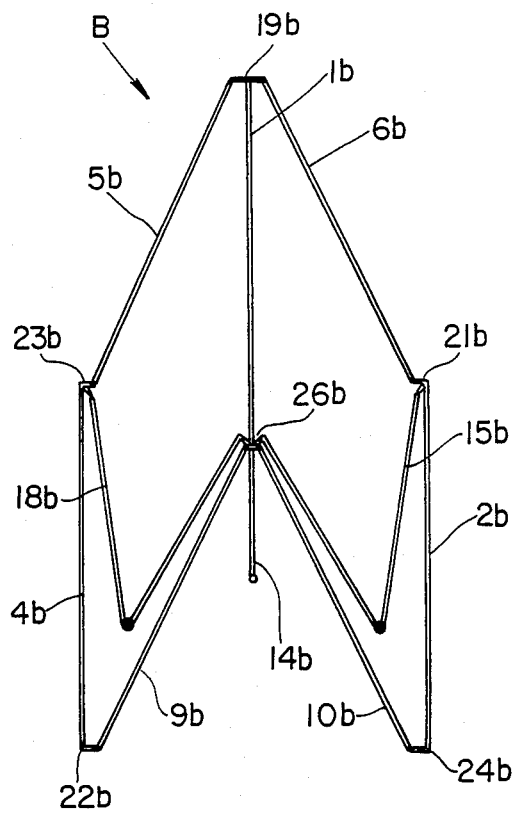
Figure 4B:
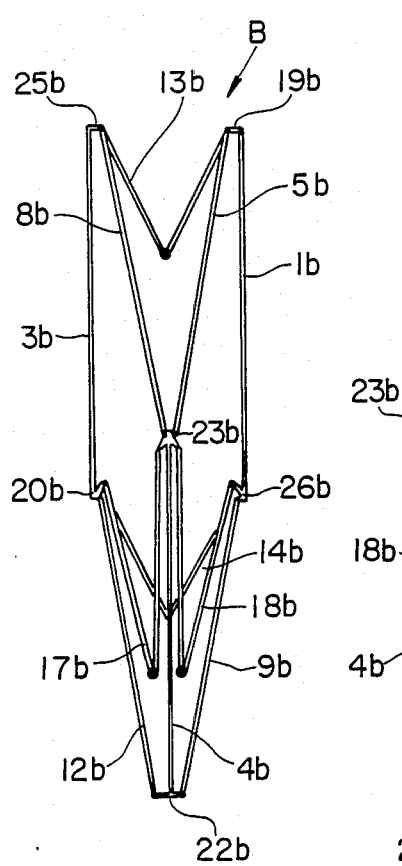

The three-dimensional truss unit A may have its configuration altered by modifying the shape of the imaginary substantial hexahedron based on which the configuration of the truss unit is determined. For example, the truss members may be arranged, in the same manner as the truss unit A shown in FIG. 1, on a hexahedron in which the ridges and the shorter diagonal lines in the front and rear faces are equal in length to each other as shown in FIGS. 3a-3c to provide a three-dimensional truss unit B. In this case all the members 5b-14b arranged in the front and rear faces are of the same length, so that two equilateral triangles are formed in each of the front and rear faces. The three-dimensional truss unit B shown in FIGS. 3a-3c can be folded as shown in FIGS. 4a–4c. The unit B as folded is similar in shape to that before being folded when seen in a plan view, and this means that the folding is performed in an orderly manner.

Figure 5A:
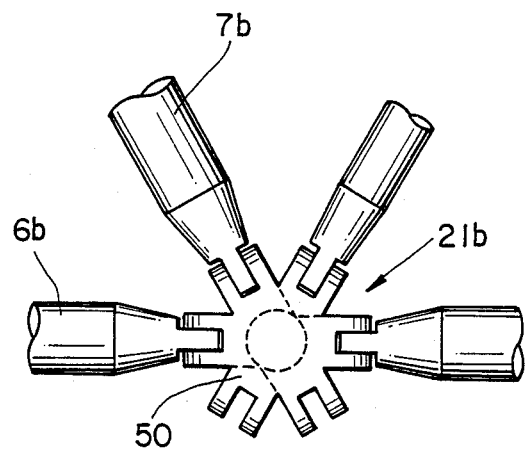
FIGS. 5a and 5b are a plan view and a front view, respectively, of the hinge block located in one node of the three-dimensional truss unit shown in FIGS. 3a–3c and 4a–4c.
Figure 5B:
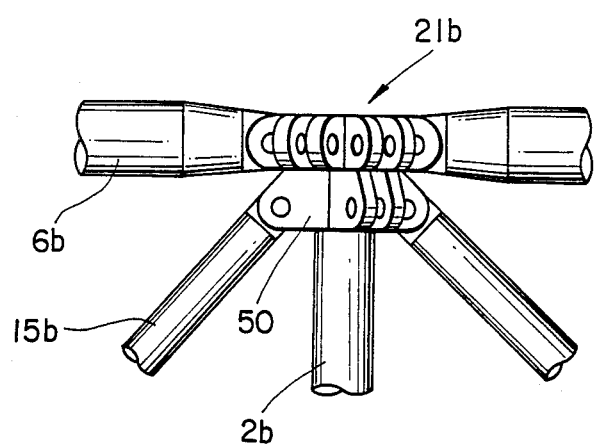
Figure 6A:
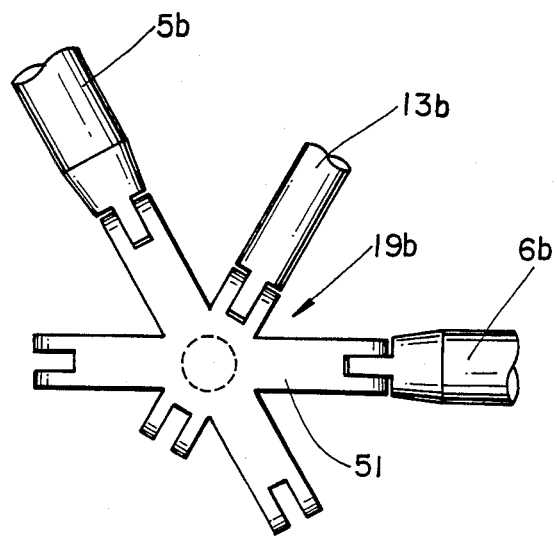
FIGS. 6a and 6b are a plan view and a front view, respectively, of the hinge block located in another node of the three-dimensional truss unit shown in FIGS. 3a–3c and 4a–4c.
Figure 6B:
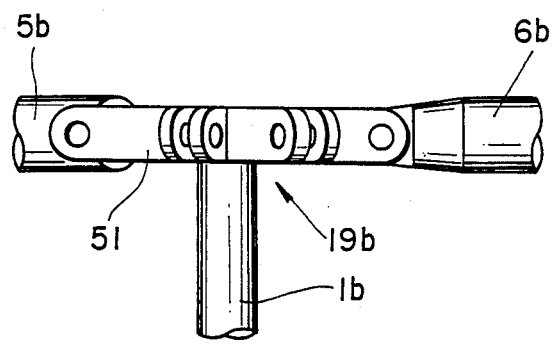

It will be seen that the three-dimensional truss unit B has a hinge block 50 shown in FIG. 5 and a hinge block 51 shown in FIG. 6 which are mounted at nodes 21b and 19b, respectively. It will be seen that the hinge blocks 50 and 51 can be used with all the three-dimensional truss units developed from the imaginary hexahedron as disclosed in this specification by varying the angle and the amount of their offset.

Generally, in the three-dimensional truss unit constituted by arranging truss members in an imaginary substantial hexahedron in the above-mentioned manner, the truss members should be dimensioned such that the lengths thereof satisfy a predetermined geometric condition which enables the truss unit to be folded and allow same to maintain the geometrical configuration. More specifically, when the truss members each essentially have a length Li, the condition that should be satisfied for allowing the aforesaid folding to be effected is as follows:

$$L7 - L6 + L5 - L8 = 0$$

$$L11 - L10 + L9 - L12 = 0$$

$$L7 + L2 - L11 - L3 = 0$$

$$L6 + L2 - L10 - L1 = 0$$

$$L1 + L9 - L4 - L5 = 0$$

$$L3 + L12 - L4 - L8 = 0$$

The truss structure provided by deploying the truss according to the invention is a statically indeterminate structure. This makes it impossible to alter the length of a single member from the rest of the members. It is essential that the lengths of other members should be altered in such a manner that a certain relation is held between the lengths of the members. By varying the length of the truss members of the truss structure while maintaining the lengths of the truss members in a predetermined geometrical condition, it is possible to provide a variety of structures distinct from each other in configuration although they are topologically identical with each other. By reducing the length of the diagonal members 13a and 14a in the front and rear faces of the three-dimensional truss unit A shown in FIG. 1 to the same level as the length of the ridge member 5a–12a thereof, it is possible to obtain the three-dimensional truss unit B shown in FIGS. 3a–3c. Generally, when the lengths of the members are altered, the need might arise to alter the position of the joint located in the middle of the diagonal members. By selecting the length of each truss member while satisfying the aforesaid condition, it is possible to provide deployable trusses of various configurations that can be folded by substantially the same method. Thus, the invention covers all of such deployable trusses. For example, a three-dimensional truss unit C shown in FIG. 7 can be obtained by replacing the ridge members 2b, 4b, 9b, 10b, 11b and 12b of the three-dimensional truss unit B shown in FIGS. 3a–3c by ridge members 2c, 4c, 9c, 10c, 11c and 12c which are greater in length in a certain amount than the ridge members 2b, 4b, 9b, 10b, 11b and 12b and substituting diagonal members 14c–18c of suitably adjusted lengths for the diagonal members 14b–18b associated with the ridge members 2b, 4b, 9b, 10b, 11b and 12b. A truss structure obtained by arranging a multiplicity of truss units C shown in FIG. 7 constitutes a macroscopic curved surface as shown in FIG. 8, and this can be folded and deployed in the same manner as described hereinabove.

Figure 9:
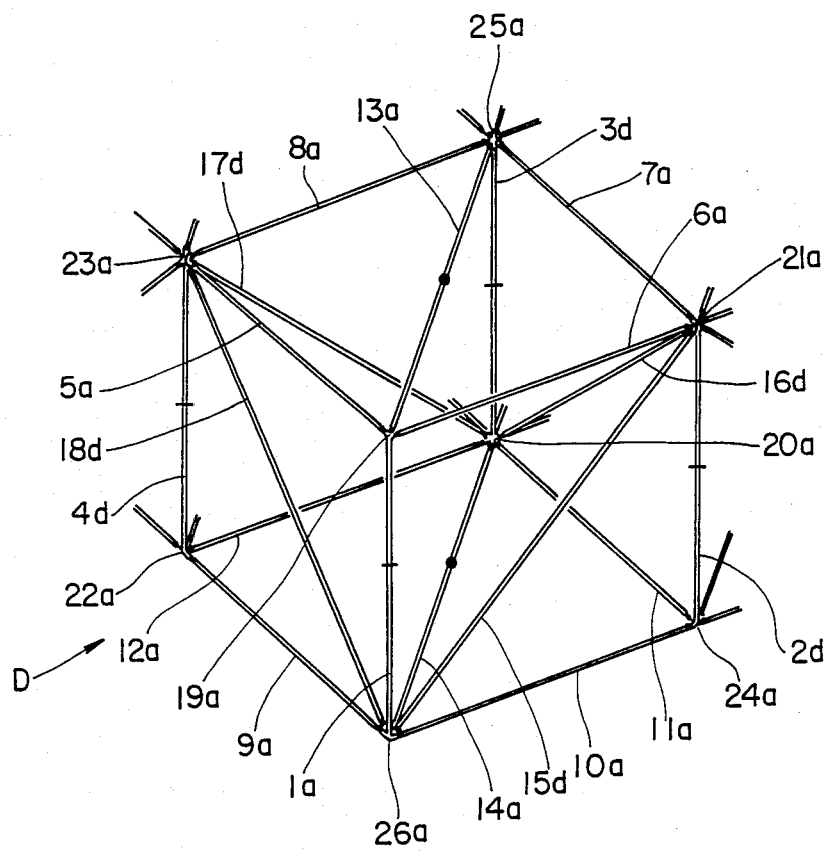
FIG. 9 is a perspective view of a three-dimensional truss unit of the deployable truss comprising a second embodiment, showing the truss unit in a deployed position.
Figure 10:
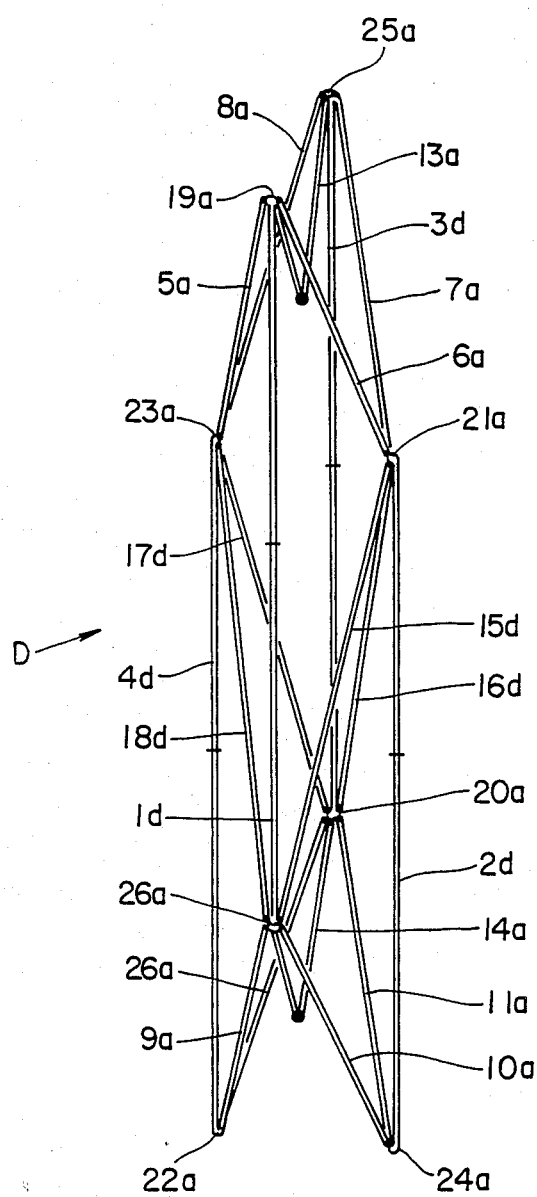
FIG. 10 is a perspective view of the three-dimensional truss unit shown in FIG. 9, showing the truss unit in a half-folded position.

A second embodiment of the deployable truss in conformity with the invention will now be described by referring to FIGS. 9 and 10. In the three-dimensional truss unit A shown in FIG. 1, the function of the diagonal member 15a, for example, is to prevent shear deformation from occurring in a quadrilateral formed by nodes 19a, 26a, 24a and 21a. When the truss unit A is folded, the diagonal members 15a is bent in the middle at the joints to have their length reduced to thereby allow shear deformation to occur in the quadrilateral. Shear deformation, however, can be made to occur in the quadrilateral by elongating the members 1a and 2a. The three-dimensional truss unit D comprising the second embodiment shown in FIGS. 9 and 10 is based on the aforesaid concept. More specifically, the three-dimensional truss unit D shown in FIGS. 9 and 10 is obtained by rendering bendable only the diagonal members 13a and 14a in the front and rear faces of the truss unit A shown in FIG. 1 and replacing the ridge members 1a, 2a, 3a and 4a of the truss unit A by ridge members 1d, 2d, 3d and 4d capable of being elongated. The three-dimensional truss unit D shown in FIG. 9 can be folded as shown in FIG. 10 by bending the diagonal members 13a and 14a in the front and rear faces and elongating the ridge members 1d–4d. It will be noted that the members 1d–4d that can be elongated are each provided with a mark in the form of a bar (−) that crosses each member to indicate that the member can be elongated. This mark is used in the following drawings showing further embodiments for the same purpose.

In the three-dimensional truss unit D shown in FIG. 9, the truss members that require manipulation such as bending and elongation are six (6) in number which is not different from the corresponding number in the truss units A–C. However, the truss members 1d, 2d, 3d and 4d that can be elongated are shared by the adjacent four truss units D when a deployable truss composed of a multiplicity of truss units D is provided. Thus, the number of truss members that require manipulation in the deployable truss is about ¾ the corresponding number in the deployable truss composed of the truss units A, B or C. This is an important advantage offered by the embodiment of the invention composed of the truss units D shown in FIG. 9.

Generally, in the three-dimensional truss unit constituted by providing an imaginary substantial hexahedron with truss members in the manner similar to the truss members of the truss unit D, the truss members should be dimensioned such that the lengths thereof satisfy a predetermined geometrical condition which enables the truss unit to be folded and allows some to maintain the geometrical configuration. More specifically, when the lengths of the truss members are denoted by the same character as described by referring to the embodiment shown in FIG. 1, the condition that should be satisfied for allowing the truss unit D shown in FIG. 9 to be folded is as follows:

$$L7 - L6 + L5 - L8 = 0$$

$$L7 + L16 - L17 - L8 = 0$$

$$L6 + L15 - L18 - L5 = 0$$

-continued $$L10 + L15 - L16 - L11 = 0$$

$$L10 + L18 - L17 - L11 = 0$$

$$L9 + L18 - L17 - L12 = 0$$

By varying the lengths of the truss members within the range of the condition, it is possible to provide deployable trusses of various configurations. For example, although not shown, it is possible to obtain three-dimensional truss units corresponding to three-dimensional truss units B and C shown in FIGS. 3a–3c and FIG. 7 respectively by modifying the three-dimensional truss unit D shown in FIG. 9, so that a three-dimensional truss structure in the form of a macroscopic flat surface and a three-dimensional truss structure in the form of a macroscopic curved surface can be provided.

Figure 11:
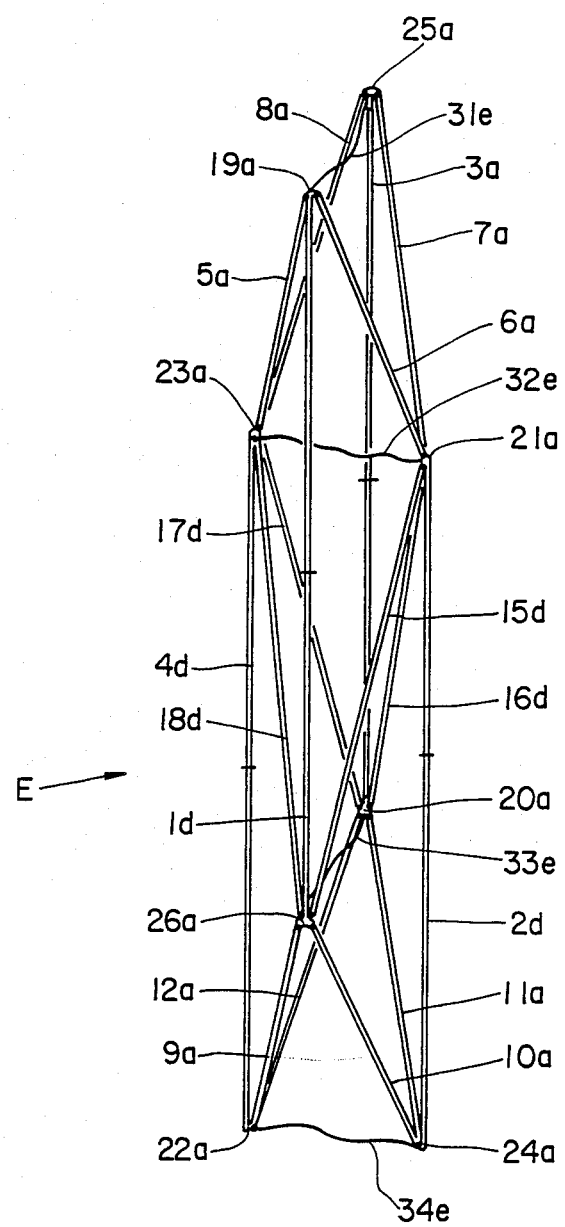
FIG. 11 is a perspective view of a modification of the three-dimensional truss unit shown in FIG. 9 wherein the diagonal members of the front and rear faces of the truss unit are replaced by tension cords.

In the embodiments shown in FIGS. 1 and 9, the diagonal members in the front and rear faces may be each replaced by two tension cords stretched in the position of the two diagonal lines of the front and rear faces. FIG. 11 shows a three-dimensional truss unit E obtained by modifying the three-dimensional truss unit D shown in FIG. 9 by using tension cords 31e–34e. The truss unit E is shown as being in the process of being folded. This embodiment offers the advantage that the number of members requiring manipulation such as elongation and bending is very small.

A third embodiment of the invention will be described by referring to FIGS. 12 and 13. In the three-dimensional truss unit A shown in FIG. 1, the function of the diagonal member 15a, for example, is to prevent shear deformation from occurring in a quadrilateral formed by the nodes 19a, 26a, 24a and 21a as described hereinabove. The quadrilateral referred to hereinabove is allowed to undergo shear deformation as the diagonal member is bent at the joint located in the middle of the diagonal member, when the truss unit A is folded. Therefore, the diagonal member 15a can be replaced by a diagonal member 27f that can be elongated which extends along the other diagoonal line connecting the nodes 19a and 24a, so that the truss can be folded by elongating the diagonal member in the same manner as the truss unit A. The same applies to all the diagonal members in the four side faces, but the diagonal members 13a and 14a in the front and rear faces are unable to be replaced by diagonal members that can be elongated.

A three-dimensional truss unit F shown in FIG. 12 can be obtained by replacing the diagonal members 15a and 16a in the side faces of the truss unit A shown in FIGS. 1 that can be bent at the joints in the middle of the members with diagonal members 27f and 28f that extend along the diagonal lines connecting the nodes 19a and 24a and the nodes 25a and 24a, respectively, and can be elongated. The truss unit F can be folded by bending the diagonal members 13a, 14a, 17a and 18a at the joints in the middle of the members and elongating the diagonal members 27f and 28f as shown in FIG. 13, and deployed by reversing the operation. FIGS. 12 and 13 are perspective views in which the truss unit F is disposed in a position inverted from that shown in FIGS. 1 and 2.

Generally, in the truss unit constituted by arranging truss members in an imaginary substantial hexahedron in the manner similar to those of the truss unit F, the truss members should be dimensioned such that the lengths thereof satisfy a predetermined geometrical condition which enables the truss unit to be folded and allows same to maintain the geometrical configuration. More specifically, the lengths of the truss members are denoted by the same character as described by referring to the embodiment shown in FIG. 1, the condition that should be satisfied for allowing the truss unit F shown in FIG. 12 to be folded as shown in FIG. 13 is as follows:

$$L11 - L10 = L12 - L9 = L8 - L5 = L7 - L6$$

$$L12 - L4 = L8 - L3$$

$$L9 - L4 = L5 - L1$$

$$L3 + L11 = L7 + L2$$

$$L1 + L10 = L6 + L2$$

By varying the lengths of the truss members within the range of the condition, it is possible to provide deployable trusses of various configurations. For example, all the truss members of the truss unit F shown in FIG. 12 may have the same length to provide a three-dimensional truss unit G shown in solid lines in FIG. 14, in which the truss members of the truss units located adjacent the truss unit G are shown in phantom lines to show the manner of arrangement of the truss units G. FIG. 14 also shows that the three-dimensional truss units located at the fringe of the deployable truss according to the invention need not necessarily be in a perfect form. The deployable truss shown in FIG. 14 is the same in configuration as the GEO-TRUSS referred to hereinabove. The invention provides an entirely new folding system in the deployable truss in the form of a macroscopic flat surface which is the same in configuration as the GEO-TRUSS when deployed macroscopically planar surface. In the GEO-TRUSS, folding is effected by bending ten (10) truss members in the front and rear faces of one truss unit. In the deployable truss according to the invention, however, the deployable truss can be folded by manipulating only six (6) truss members of one truss unit or bending two (2) diagonal members in the front and rear faces and two (2) diagonal members in the side faces and elongating two (2) diagonal members in the side faces. This means that, in a deployable truss composed of a large number of truss units, the number of truss members that require manipulation can be reduced to about ⅔ the nubmer of truss members that require manipulation in the GEO-TRUSS. Moreover, the meaning of the new folding system is significant also in view of the fact that the number of truss members in the front and rear faces that require manipulation is reduced and forces act on these members most.

The three-dimensional truss unit F shown in FIG. 12 can be modified in accordance with the above mentioned predetermined geometrical condition in the same manner as described by referring to FIG. 7, so that a three-dimensional truss structure in the form of a macroscopic curved surface can be provided.

Although the three-dimensional truss structures in the form of a macroscopic flat surface or a macroscopic curved surface constituted by the truss units A–G of various configurations have been shown and described hereinabove, it will be apparent that the deployable truss according to the invention can also be constituted as three-dimensional truss structure in the form of macroscopic straight or curved line by arranging a plurality of respective truss units in a single row.

A joint having lock means 100 shown in FIGS. 15a and 15b may be used as the joint of the aforesaid bendable truss members. The joint having lock means 100 comprises a bifurcated member 102 attached to a forward end of one portion 101 of one truss member, and an arm member 104 attached to a forward end of another portion 103 of the truss member adapted to be received in a gap formed in the bifurcated member 102, with the bifurcated member 102 and arm member 104 being pivotally connected to each other by a pin 105. A lock collar 108 biased by a spring 107 toward the arm member 104 is slidably fitted to a base 106 of the bifurcated member 102. When the portions 101 and 103 of the truss member are straightened as shown in FIGS. 15a and 15b, the lock collar 108 moves in a manner to cover both a rear end of the bifurcated member 102 and a forward end of the arm member 104 and is brought into abutting engagement with a stopper 109 located at the arm member 104. When the portions 101 and 103 of the truss member are desired to be bent at the joint having lock means 100, the lock collar 108 is moved leftwardly in FIGS. 15a and 15b against the biasing force of the spring 107 out of engagement with the forward end of the arm member 104 to thereby allow the bifurcated member 102 and arm member 104 to pivotally move about the pin 105. This allows the portions 101 and 103 to be bent at the joint with lock means 100. When it is desired to straighten the portions 101 and 103 of the truss member, the bifurcated member 102 and arm member 104 are pivotally moved about the pin 105 until they are brought into alignment with each other. This allows the lock collar 108 to be moved by the biasing force of the spring 107 to a position in which it is brought into abutting engagement with the stopper 109, thereby locking the two portions 101 and 103 of the truss member in a position in which they form a straight line.

An elongation mechanism having lock means 110 shown in FIG. 16 may be used for elongating the truss members that can be elongated as described hereinabove. The elongation mechanism having lock means 110 comprises a shaft portion 112 attached to a forward end of one portion 111 of a truss member, a tubular portion 114 formed at a forward end of another portion 113 of the truss member for receiving the shaft portion 112 inserted therein and a coil spring 115 mounted between a forward end of the shaft portion 112 and an axial center bore of the tubular portion 114. Balls 116 of a suitable number are fitted circumferentially in the wall of the tubular portion 114 for slight radial movements, and an annular groove 117 is formed in the shaft portion 112 for the balls 116 to be engaged therein. A stopper flange 118 is located adjacent the peripheral groove 117, and a lock sleeve 120 having a radial projection 121 formed on an inner peripheral surface is fitted over the shaft portion 112 and urged by a spring 119 to move toward the portion 113 of the truss member, so that the radial projection 121 abuts against the stopper flange 118. The lock sleeve 120 has an inner diameter at its forward end which is selected such that, when the tubular portion 114 receives the shaft portion 112 in the axial center bore thereof, the balls 116 riding the shaft portion 112 and projecting radially outwardly are brought into engagement with an end face of the lock sleeve 120, and when the shaft portion 112 is further moved into the tubular portion 114 while the balls 116 are kept in engagement with the end face of the lock sleeve 120, the lock sleeve 120 is caused to move leftwardly with the tubular portion 114 as a unit against the biasing force of the spring 119; when the balls 116 has reached the peripheral groove 117, they enter the groove 117 and the lock sleeve 120 is urged by the biasing force of the spring 119 to move to a position in which the radial projection 121 again abuts against the stopper flange 118 and the lock sleeve 120 covers the balls 116. In FIG. 16, the two portions 111 and 113 of the truss member are shown in a position in which the truss member is elongated. To restore the truss member to the original or non-elongated position, the shaft portion 112 has only to be inserted in the tubular portion 114 until the balls 116 enter the peripheral groove 117, so that the lock sleeve 120 covers the balls 116 to avoid the dislodging of the balls 116 from the groove 117 and lock the portions 111 and 113 in position. When it is desired to elongate the truss member, one only has to move the lock sleeve 120 leftwardly against the biasing force of the spring 119. This releases the balls 116 from the position in which they are restrained by the lock sleeve 120, thereby allowing the shaft portion 112 to be withdrawn from the tubular portion 114.

As described hereinabove, the deployable truss according to the invention enables the number of truss members of a three-dimensional truss unit that require manipulation, when the truss unit is to be folded or deployed to be reduced to six (6) from ten (10) which is the number of truss members to be manipulated in the prior art. Thus, when a multiplicity of the three-dimensional truss units are assembled to provide a three-dimensional truss structure, the number of truss members that require manipulation can be reduced to $\frac{2}{3}-\frac{1}{2}$ the number of truss members of the conventional GEO-TRUSS. Generally, forces of high magnitude are exerted on the truss members in the front and rear faces of the truss unit, so that manipulation of these truss members is not desirable to achieve high strength and stiffness in a deployed truss. In the deployable truss according to the invention, the number of truss members in the front and rear faces of a truss unit that require manipulation is reduced to $\frac{1}{3}$ the number of corresponding truss members of the GEO-TRUSS, for example. It will be appreciated that this enables two-dimensional and one-dimensional truss structures composed of a plurality of truss units according to the invention to have higher specific strength and specific stiffness than has hitherto been the case in the prior art.

By referring to FIGS. 17a–17c, 18a–18c and 19a–19c, 91 a fourth embodiment of the deployable truss in conformity with the invention will be described. The deployable truss of this embodiment which is generally designated by the reference numeral H is composed of a plurality of regular tetrahedral truss units. The deployable truss H should be understood to be part of a larger deployable truss structure, the part having fifteen (15) nodes 1–15. By denoting each node with (i, j, k) in which i and j are arbitrarily selected integers 0, 1, 2 ... and k is 0 and 1 and by denoting the length of a truss member between the nodes which is constant with L, the positions of the nodes (i, j, k) can be written as $(iL+jL/2+kL/2, j\sqrt{3}L/2+kL/(2\sqrt{3}), kL\sqrt{2/3})$ in the Cartesian coordinates. The regular tetrahedral truss units of the deployable truss H are joined together to provide a three-dimensional truss structure in the form of a macroscopic flat surface such that a node (i, j, 0) and a node (i+1, j, 0), a node (i+1, j, 0) and a node (i, j+1, 0), a node (i, j+1, 0) and a node (i, j, 0), a node (i, j, 0) and a node (i, j, 1), a node (i, j, 1) and a node (i, j+1, 0), a node (i, j, 1) and a node (i+1, j, 1), a node (i, j, 1) and a node (i+1, j, 1), a node (i, j, 1) and a node (i, j+1, 1), and a node (i+1, j, 1) and a node (i, j+1, 1) are each connected together by a truss member with respect to all the values of i and j in a zone in which the truss structure exists when deployed. In the deployable truss H, truss members connecting the node (i, j, 0) and the node (i+1, j, 0) or truss members 1-2 (1-2 designating a truss member joining a node 1 and a node 2, as hereinafter a digit combination is used to designate each truss member), 2-3, 3-4, 5-6, 6-7 and 8-9 and truss members connecting the node (i, j, 1) and the node (i+1, j, 1) or truss members 10-11, 11-12 and 13-14 can be bent at an articulated joint located in the middle of each truss member, truss members connecting the node (i, j, 1) and the node (i, j+1, 0) in which i is an odd number or truss members 8-13 and 9-14 can be shortened, and the truss members connecting the node (i, j, 1) and the node (i, j+1, 0) in which j is an even number or truss members 5-10, 6-11, 7-12 can be elongated. 0 is considered to be an even number. In the drawings, a black ball (●) designates an articulated joint, and the truss member that can be elongated is designated by a bar (—) that crosses each truss member. As can be clearly seen in the drawings, the truss members 8-13 and 9-14 are each allowed to be shortened by providing an articulated joint disposed in the middle of each truss member.

In the drawings, a circle (0) designates an articulated joint located at each node. The extent to which each joint is offset from the node at which it is located is exaggerated. Lines connecting together the joints located in the nodes each indicate a center line of a truss member.

Figure 17B:
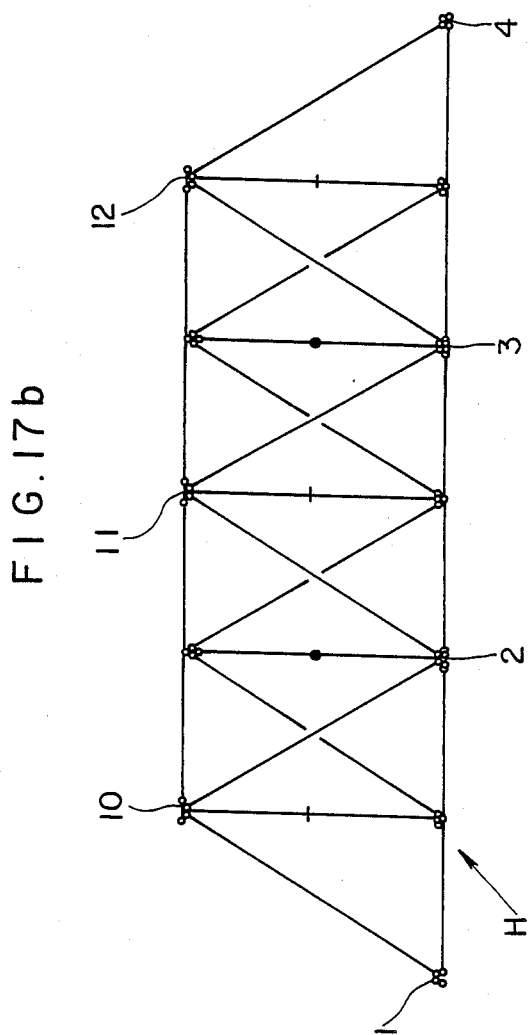

In the embodiment shown and described hereinabove, the joints designated by the black ball (●) that enable the truss members to be bent or shortened each have a lock means so that each truss member is allowed to be bent through 180 degrees when the lock means is released, and the lock means is operative to automatically lock the truss members when it is straightened as shown in FIGS. 17a-17c. The truss members that can be elongated are each provided with an elongation mechanism having a lock means, which allows the truss member to be elongated when the lock means is released, and the lock means is operative to lock the truss member so as to fix the length when the truss member is restored to its original shortened position as shown in FIGS. 17a-17c. The joint having lock means 100 described by referrring to FIGS. 15a and 15b may be used as the joints described hereinabove, and the elongation mechanism having lock means 110 described hereinabove by referring to FIG. 16 may be used as the elongation mechanism described hereinabove.

Figure 18A:
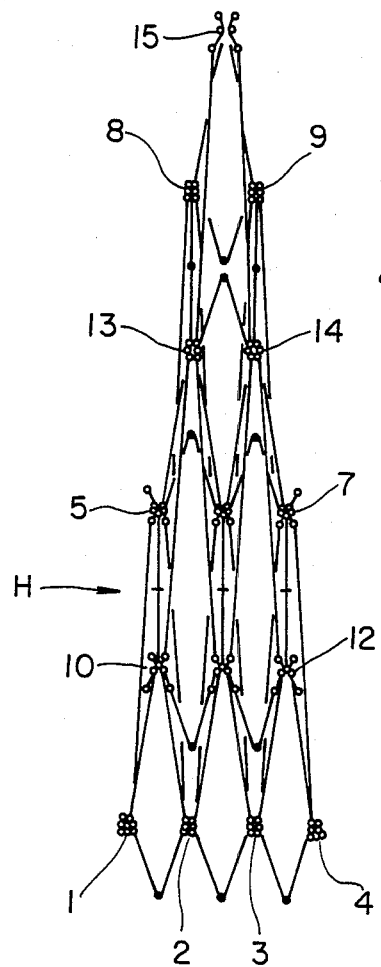
FIGS. 18a–18c are a plan view, a front view and a side view, respectively, of the portion of the deployable truss according to the invention shown in FIGS. 17a-17c, showing the portion in a position in which it is substantially folded in a first direction.
Figure 18C:
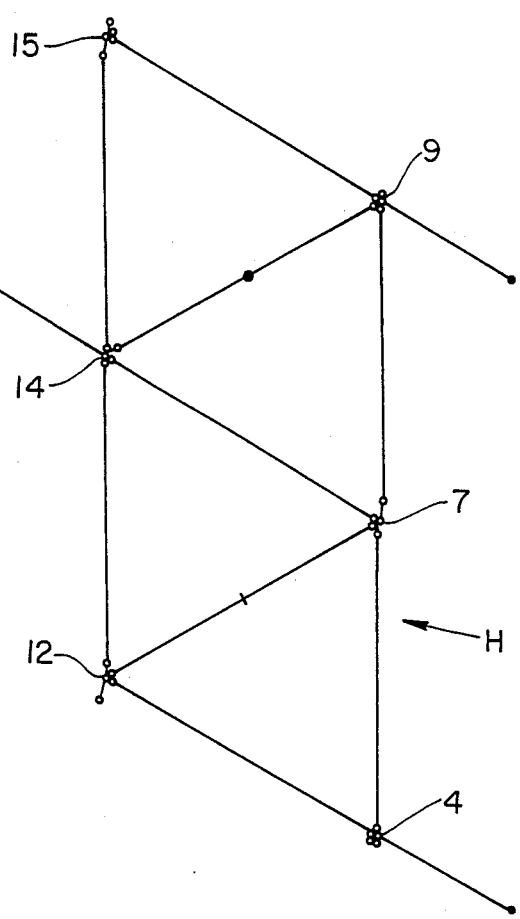
Figure 18B:
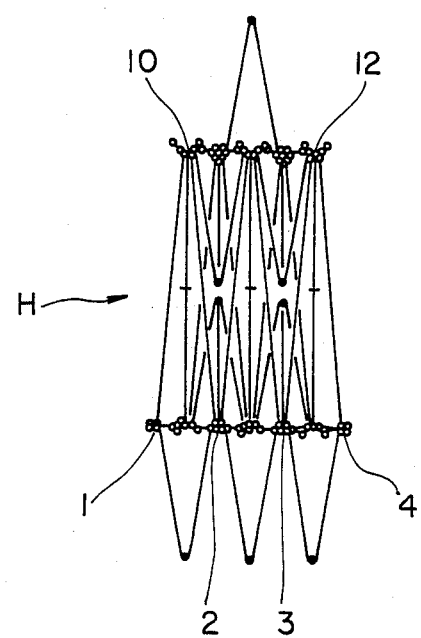
Figure 19B:
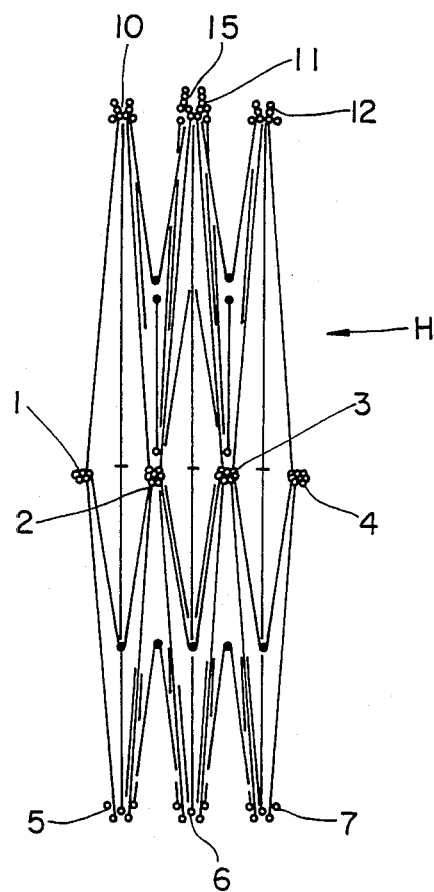

The deployable truss H shown in FIGS. 17a-17c is folded in one direction as shown in FIGS. 18a-18c when the truss members 1-2, 2-3, 3-4, 5-6, 6-7, 8-9, 10-11, 11-12 and 13-14 are bent at their joints located in the middle of the truss members. The deployable truss H shown in FIGS. 18a-18c is further folded into another direction when the truss members 8-13 and 9-14 are bent at their joints located in the middle of the truss members and the truss members 5-10, 6-11 and 7-12 are elongated, so that the deployable truss H can after all be compactly folded to occupy a small space as shown in FIGS. 19a-19c. By reversing the process described hereinabove, the deployable truss H shown in FIG. 19a-19c is deployed into the original configuration in the form of a macroscopic flat surface, so that a three-dimensional truss structure high in stiffness is obtained by the function of the lock means.

While the deployable truss H has been shown and described as being folded and deployed through the phase shown in FIGS. 18a-18c, it is not essential that the folding and deploying operations be performed through the phase shown in FIGS. 18a-18c. The folding and deploying operations may be performed through a phase intermediate between the phase shown in FIGS. 17a-17c and the phase shown in FIGS. 19a-19c, and the direction in which the truss members are shortened when the deployable truss H is folded may be reversed.

In the deployable truss H, a hinge block 52 shown in FIGS. 20a-20c, for example, may be used at the node 14. Truss members 20h, 21h, 22h and 23h are each joined to the hinge block 52 through a ball joint 24h as shown in FIGS. 20a and 20b. Truss members 16h, 17h, 18h and 19h are each joined to the hinge block 52 through a joint having a degreee of freedom of 1, as shown in FIG. 20c. The truss members 16h and 17h form an angle which, when increased to a level reached when the truss has been deployed, is prevented from further increasing as a claw 26h located at each of the truss members is brought into engagement with the hinge block 52 and serves as a stopper. Thus, the truss members 16h and 17h cooperate with the truss members 18h and 19h to prevent the rotating of the hinge block 52.

Generally, in the three-dimensional deployable truss composed of a plurality of tetrahedral truss units, the truss members should be dimensioned such that the lengths thereof satisfy a predetermined geometrical condition which enables the truss to be folded and allows same to maintain the geometrical configuration. More specifically, to enable a three-dimensional truss structure composed of a plurality of regular tetrahedral truss units to be folded in the same manner as described by referring to the deployable truss H hereinabove, the following relation should hold with respect to all the values of i and j in a zone in which the structure is located when the essential distance between a node (i, j, k) and a node (l, m, n) is designated by L(i, j, k; l, m, n):

$$L(i, 2k, 1; i-1, 2k+1, 1) + L(i-1, 2k+1, 1; i, 2k+1, 0) =$$

$$L(i, 2k, 1; i, 2k, 0) + L(i, 2k, 0; i, 2k+1, 0) =$$

$$L(i, 2k, 1; i+1, 2k, 0) + L(i+1, 2k, 0; i, 2k+1, 0) =$$

$$L(i, 2k, 1; i, 2k+1, 1) + L(i, 2k+1, 1; i, 2k+1, 0)$$

$$L(i+1, 2k, 0; i+1, 2k+1, 0) - L(i+1, 2k, 0; i, 2k+1, 0) = L(i, 2k+1, 1; i+1, 2k+1, 0) -$$

$$L(i, 2k+1, 1; i, 2k+1, 0) =$$

$$L(i, 2k+2, 0; i, 2k+1, 0) -$$

$$L(i, 2k+2, 0; i, 2k+1, 0)$$

$$L(i+1, 2k, 1; i+1, 2k+1, 1) - L(i+1, 2k, 1; i, 2k+1, 1) = L(i, 2k+1, 1; i+1, 2k+1, 0) -$$

$$L(i+1, 2k+1, 0; i+1, 2k+1, 1) =$$

$$L(i, 2k+2, 1; i+1, 2k+1, 1) -$$

-continued $$L(i, 2k+2, 1; i, 2k+1, 1)$$

$$L(i, 2k, 0; i, 2k, 1) - L(i, 2k-1, 1; i, 2k,$$

$$1) = L(i+1, 2k-1, 0; i, 2k-1, 1) -$$

$$(i+1, 2k-1, 0; i, 2k, 0) = L(i, 2k-1, 0; i, 2k-1, 1) -$$

$$L(i, 2k, 0; i, 2k-1, 0) =$$

$$L(i, 2k, 0; i-1, 2k, 1) -$$

$$L(i, 2k-1, 1; i-1, 2k, 1)$$

$$L(i+1, 2k-1, 1; i+1, 2k, 1) -$$

$$L(i+1, 2k-1, 1; i, 2k,$$

$$1) = L(i+1, 2k, 0; i+1, 2k, 1) -$$

$$L(i+1, 2k, 0; i, 2k, 1) =$$

$$L(i, 2k+1, 1; i+1, 2k, 1) - L(i, 2k+1, 1; i, 2k, 1)$$

$$L(i+1, 2k-1, 0; i+1, 2k, 0) - L(i+1, 2k,$$

$$0; i, 2k, 0) = L(i, 2k, 1; i, 2k, 0) -$$

$$L(i, 2k, 1; i+1, 2k, 0) = L(i, 2k+1, 0; i+1,$$

$$2k, 0) - L(i, 2k+1, 0; i, 2k, 0)$$

Figure 21:
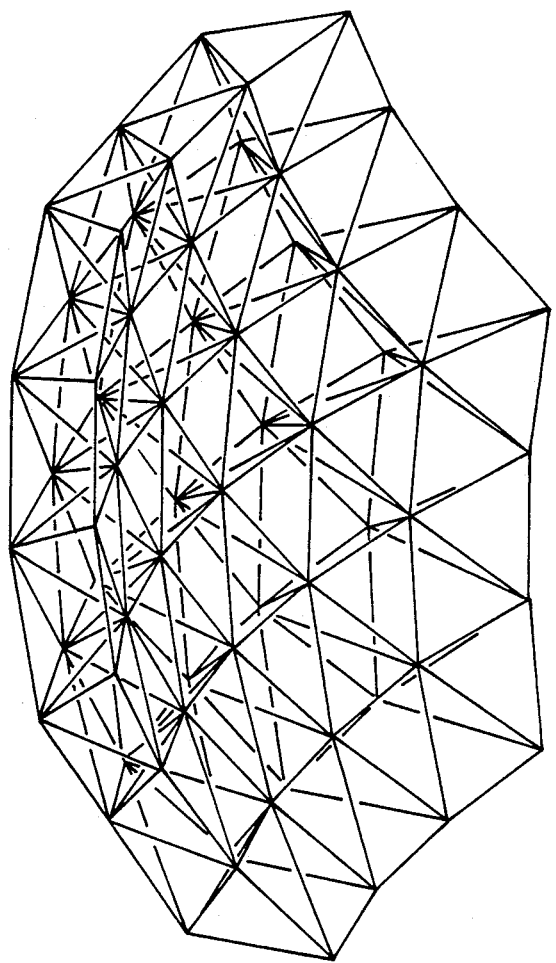
FIG. 21 is a perspective view of a three-dimensional truss structure in the form of a macroscopic curved surface obtained by modifying the fourth embodiment shown in FIGS. 17a-17c.

By varying the positions of the nodes of the deployable truss H shown as part in FIGS. 17a-17c while satisfying the aforesaid condition, it is possible to provide three-dimensional truss structures in the form of a macroscopic flat or curved surface which are each composed of tetrahedral truss units of various configurations. For example, it is possible to provide a three-dimensional truss structure in the form of a macroscopic curved surface of a curvature which is relatively small in the vertical and horizontal directions in FIG. 17a by slightly increasing the lengths L(i, j, 0; i−1, i, 0), L(i, j, 0; i, j+1, 0) and L(i, j, 0; i−1, j+1, 0) with regard to all i and j and by slightly increasing the lengths L(i, j, 0; i, j, 1) and L(i, j, 0; i−1, j, 1) with regard to all the i and all the j which are odd numbers in the deployable truss shown in FIGS. 17a-17c and by adjusting the rest of the members so that the lengths of all the truss members satisfy the above-mentioned predetermined geometrical condition. Thus, it is possible to provide a three-dimensional truss structure in the form of a macroscopic curved surface as shown in FIG. 21.

In the deployable truss H shown in FIGS. 17a-17c, the truss members 8-13 and 9-14 that can be shortened have been described as having their length reduced by bending each of them at the joint located in the middle of the respective truss member. However, the invention is not limited to this specific means for reducing the length of the truss members and any other means known in the art for reducing the length of the truss members may be used to allow the deployable truss to be folded by the same principle as described hereinabove in this specification.

Figure 22A:
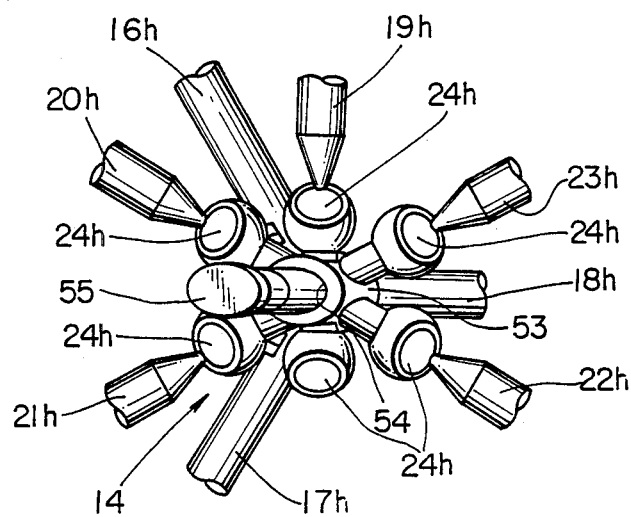
FIGS. 22a and 22b are a plan view and a front view, respectively, of the hinge block adapted to move in sliding movement on the truss members of the embodiment shown in FIGS. 17a-17c which provide contractable truss members.
Figure 22B:
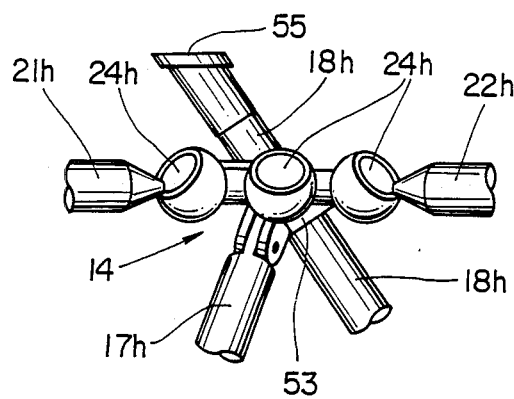

FIGS. 22a and 22b show one example of another means for shortening the truss members in which a truss member is slidably inserted in a hinge block which is able to move in sliding movement over the truss member so as to reduce the essential length of the truss member or the distance between the two nodes at the opposite ends of the truss members. In FIG. 22a and 22b, the hinge block 53 located in the node 14 and the truss members joined thereto as shown in FIGS. 17a-17c are shown, and the truss member 18h is shown as having its essential length slightly reduced from the length it has when the truss is fully deployed. The hinge block 53 is formed with an axial center bore 54 which allows the truss member 18h to extend therethrough so that the hinge block 53 can move in sliding movement over the truss member 18h. A stopper 55 is located at a forward end of the truss member 18h, and lock means is mounted, although not shown between the hinge block 53 and truss member 18h to automatically lock the truss member 18h in position when the truss has finished deploying. A gap between the truss member 18h and hinge block 53 only has to be eliminated when the truss has finished deploying or when the hinge block 53 has moved to the utmost end of the truss member 18h. This facilitates the fabrication of the sliding hinge block 53.

The elongation mechanism for elongating a truss member when a truss is folded may be in the form of a telescopic device which enables portions of the truss member to be slidably inserted one in another. When this device is used, the weight of a truss member can be greatly reduced because the portion or portions thereof which are received in other portions can have their thickness reduced since no great force is exerted thereon when the truss is folded.

From the foregoing description, assuming that a deployable truss is constructed which has nodes as denoted by the node denoting system described hereinabove and in which i=0-N, j=0-M and k=0-1, in the deployable GEO-TRUSS of the prior art, all the truss members of the front and rear surfaces or (6MN+2M+2N) truss members should be bent in the middle of each truss member. Meanwhile, in the deployable truss according to the invention, the number of truss members that should be manipulated or the truss members that should be elongated or shortened when the truss is folded is (3MN+2N+M). Thus, when M and N are large in value, the number of truss members that require manipulation is reduced to about ½ the number of truss members that require manipulation in the prior art. The truss members that are bent in the middle can be reduced in number to about 5/12 that in the deployable GEO-TRUSS in the case of the embodiment using a joint in the truss member that can be shortened and to about ⅓ that in the deployable GEO-TRUSS in the case of the embodiment using a hinge block slidable over the truss member, that can be shortened, when M and N are large in value. It will be appreciated that the invention provides a satisfactory solution to the problems that faced the deployable truss of the prior art.

A fifth embodiment of the deployable truss in conformity with the invention will be described by referring to FIGS. 23a-23c and 24a-24c.

The deployable truss of this embodiment which is generally designated by the referecne character P is composed of a plurality of regular pentahedral truss units. The truss P should be understood to be part of a larger deployable truss structure, the part having eighteen (18) nodes. Be denoting each node with (i, j, k) in which i and j are arbitrarily selected integers 0, 1, 2, ... and k is 0 and 1, truss P corresponds to a portion constituted by the nodes 1-18 which can be expressed with i=0-2, j=0-2 and k=0 and 1. When the length of the truss members between the nodes which are constant is designated by L, the positions of the nodes (i, j, k) can be written as $(iL+kL/2, jL+kL/2, kL/\sqrt{2})$ in the Cartesian coordinates. The regular pentahedral truss units of the deployable truss P are jointed together to provide a three-dimensional truss structure in the form of a macroscopic flat surface, such that a node (i, j, 0) and a node (i+1, i, 0), a node (i, j, 0) and a node (i, j+1, 0), a node (i, j, 0) and a node (i, j, 1) a node (i+1, j, 0) and a node (i, j, 1), a node (i, j, 1) and a node (i, j+1, 0), a node (i, j, 1) and a node (i+1, j+1, 0) a node (i, j, 1) and a node (i+1, j, 1), and a node (i, j, 1) and a node (i, j+1, 1) are each connected together by a truss member with respect to all the values of i and j in a zone in which the structure exists when deployed.

In the deployable truss P, of all the truss members joining the node (i, j, 0) and the node (i, j, 1) and the truss members joining the node (i, j, 1) and the node (i+1, j+1, 0), those truss members in which i+j is an odd number or truss members 2-11 (2-11 designating a truss member joinging a node 2 and a node 11, as hereinafter a digit combination is used to designate each truss member), 11-6, 6-15, 4-13, 13-8 and 8-17 can be elongated and those truss members in which i+j is an odd number or truss members 3-12, 1-10, 10-5, 5-14, 14-9, 9-18 and 7-16 can be shortened. 0 is considered to be an even number. In the embodiment shown and described hereinabove, the truss members that can be shortened have their length reduced by allowing themselves to be bent at an articulated joint located in the middle thereof. In the drawings, the joints are each designated by a black ball (●), and the truss members that can be elongated are designated by a bar (—) crossing each truss member.

Figure 23B:
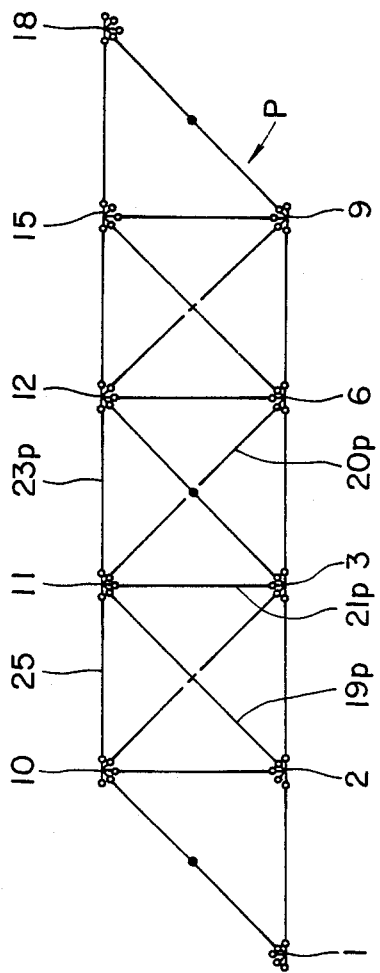
Figure 24C:
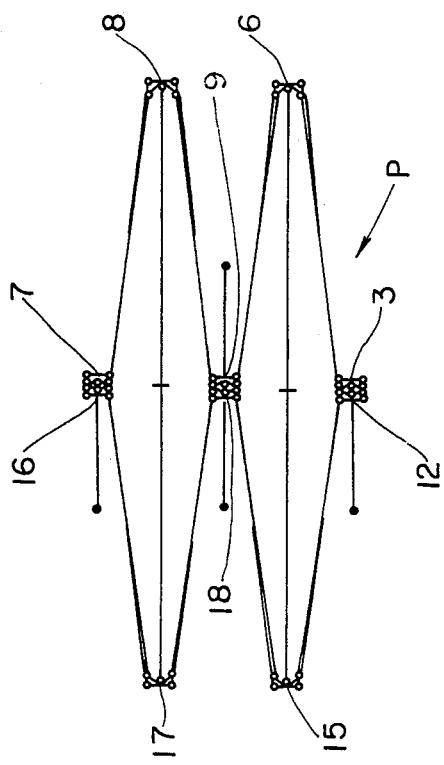
FIGS. 24a-24c are a plan view, a front view and a side view, respectively, of the portion of the deployable truss shown in FIGS. 23a-23c, showing the portion in a substantially folded position.
Figure 24A:
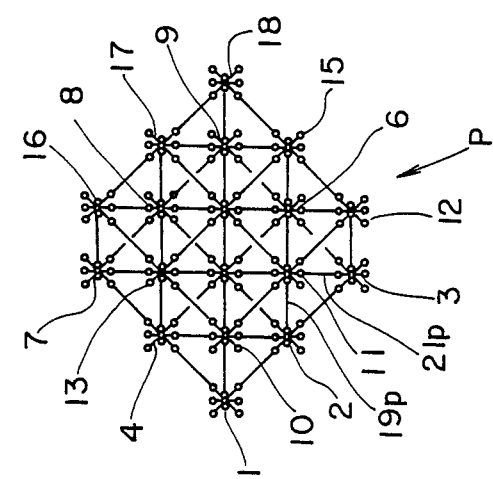
Figure 24B:
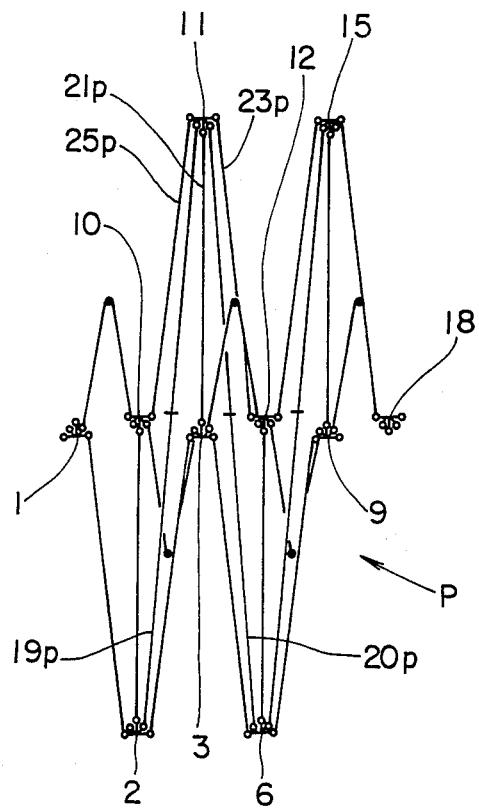

In the drawings, a circle (0) indicates an articulated joint located at a node. The extent to which each joint is offset from the node at which it is located is exaggerated. Lines connecting together the joints located in the nodes each indicate a center line of a truss member. The joints designated by the black ball (●) enabling the truss members to be bent or shortened each have a lock means so that each truss member is allowed to be bent through 180 degrees when the lock means is released, and the lock means is operative to automatically lock the truss member when it is straightened as shown in FIGS. 23a-23c. The truss members designated by the bar (—) that can be elongated are each provided with an elongation mechanism having a lock means which allows the truss member to be elongated when the lock means is released, and the lock means is operative to lock the truss member so as to fix the length when the truss member is restored to its original shortened position as shown in FIGS. 24a-24c. The joint having lock means 100 described by referring to FIGS. 15a and 15b may be used as the joints described hereinabove, and the elongation mechanism having lock means 110 described hereinabove by referring to FIG. 16 may be used as the elongation mechanism described hereinabove.

In the deployable truss P, the truss members 2-11, 11-6, 6-15, 4-13, 13-8 and 8-17 can be elongated, and the truss members 3-12, 1-10, 10-5, 5-14, 14-9, 9-18 and 7-16 can be bent at the joint located in the middle of each truss member. By manipulating these truss members as described, it is possible to fold the truss P from the deployed position shown in FIGS. 23a-23c to occupy a small space as shown in 24a-24c. By deploying the truss H from the folded position shown in FIGS. 24a-24c by reversing the process, it is possible to provide a three-dimensional truss structure in the form of a macroscopic flat surface which is high in stiffness by the function of the lock means.

In performing deploying and folding operations, the truss P can be contracted vertically and horizontally at the same time, and it is possible, if necessary, to contract the truss P first in a vertical direction and then in a horizontal direction or vice versa.

Figure 25:
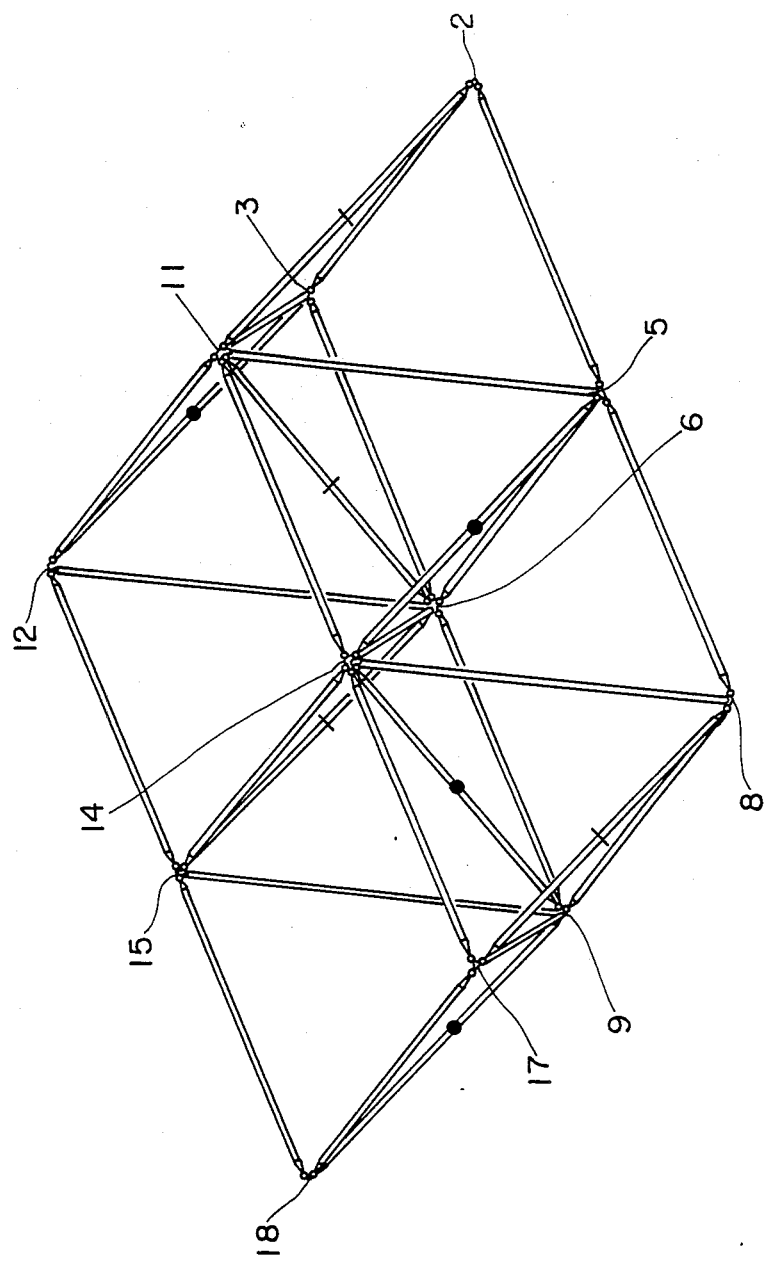
FIG. 25 is a perspective view of a portion of the deployable truss shown in a deployed position, in FIGS. 23a-23c, said portion being composed of members joined together at the nodes 2, 3, 5, 6, 8, 9, 11, 12, 14, 15, 17 and 18.
Figure 26:
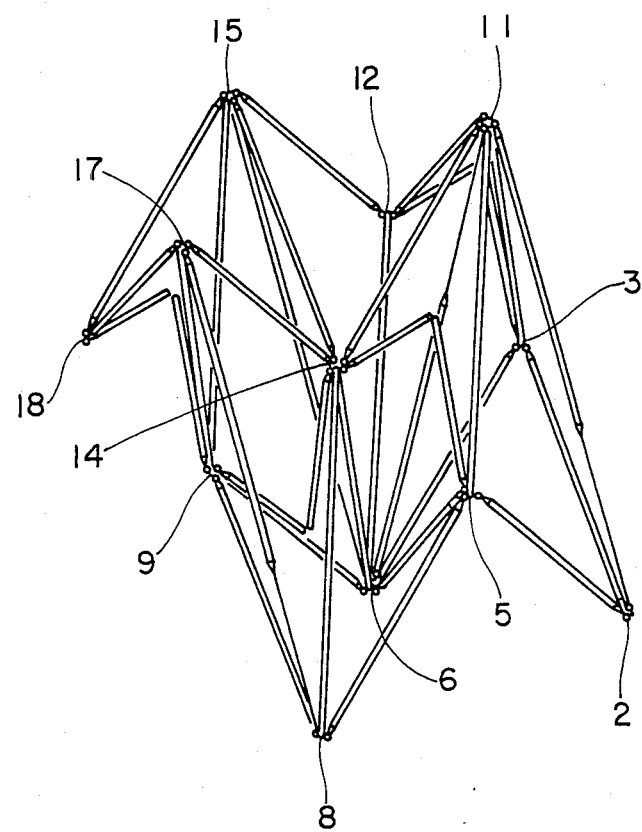
FIG. 26 is a perspective view of the deployable truss shown in FIG. 25, showing the deployable truss in a half-folded position.

FIG. 25 is a perspective view, on an enlarged scale, of a portion of the deployable truss P shown in FIGS. 23a-23c in a deployed position which is composed of truss members joined together at the nodes 2, 3, 5, 6, 8, 9, 11, 12, 14, 15, 17 and 18, and FIG. 26 is a perspective view of the portion of the deployable truss P in a half-folded position.

Figure 27A:
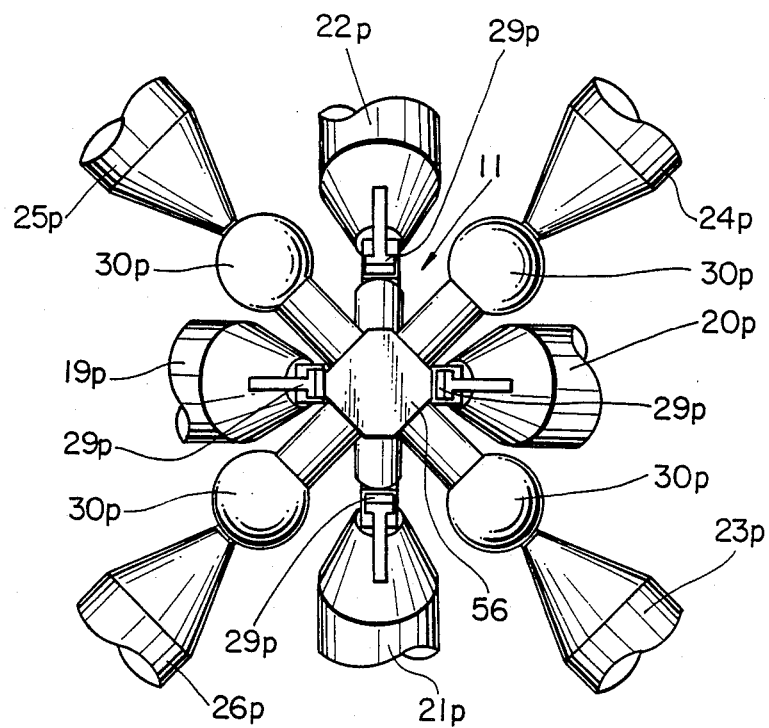
FIGS. 27a and 27b are a plan view and a front view, respectively, of the hinge block located in one node of the deployable truss shown in FIGS. 23a-23c.
Figure 27B:
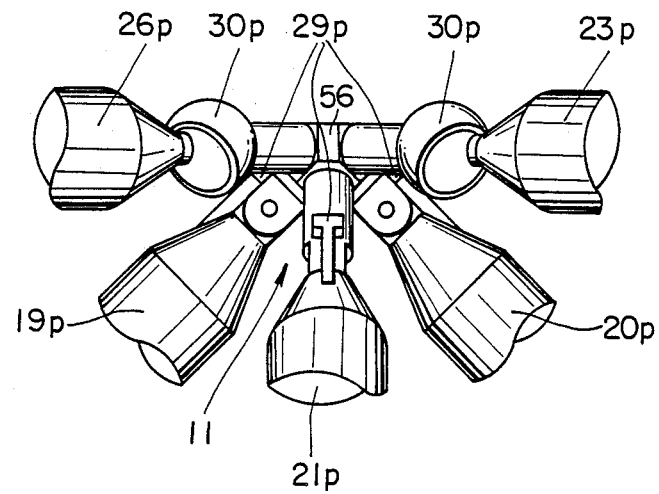

A hinge block 56 shown in FIGS. 27a and 27b, for example, may be mounted in the node 11 of the deployable truss P. Truss members 23P-26P are each joined to the hinge block 56 through a ball joint 30P, and truss members 19P-22P are each joined to the hinge block 56 through a hinge having a degree of freedom of 1. The truss members 19P and 20P and the truss members 21P and 22P form angles which, when increased to a level reached when the truss has been deployed, are prevented from further increasing as a claw 29P located in each of the truss members is brought into engagement with the hinge block 56 and serves as a stopper. Thus, the truss members 19-22 prevent and rotation of the hinge block 56 after the truss has been deployed.

Generally, in the three-dimensional deployable truss composed of a plurality of pentahedral truss units, truss members should be dimensional such that the lengths thereof satisfy a predetermined geometrical condition which enables the truss to be folded and allows same to maintain the geometrical configuration. More specifically to enable a three-dimensional deployable truss composed of a plurality of pentahedral truss units to be folded in the same manner as described by referring to the deployable truss P hereinabove, the following relation should hold with respect to all the values of i and j in a zone in which the structure is located when the essential distance bewteen a node (i, j, k) and a node (l, m, n) is designated by L(i, j, k; l, m, n):

$$L(i, 2j - i, 1; i, 2j - i + 1, 1) -$$
$$L(i, 2j - i + 1, 1; i + 1, 2j - i + 1, 0) =$$
$$L(i, 2j - i, 1; i + 1, 2j - i, 1) -$$
$$L(i + 1, 2j - i, 1; i + 1, 2j - i + 1, 0) =$$
$$L(i + 1, 2j - i + 1, 0; i + 1, 2j - i, 0) -$$
$$L(i + 1, 2j - i, 0; i, 2j - i, 1) =$$
$$L(i + 1, 2j - i + 1, 0; i, 2j - i + 1, 0) -$$
$$L(i, 2j - i + 1, 0; i, 2j - i, 1)$$

$$L(i, 2j - i, 1; i, 2j - i - 1, 1) -$$
$$L(i, 2j - i - 1, 1; i, 2j - i, 0) =$$
$$L(i, 2j - i, 1; i - 1, 2j - i, 1) -$$
$$L(i - 1, 2j - i, 1; i, 2j - i, 0) =$$
$$L(i, 2j - i, 0; i, 2j - i + 1, 0) -$$
$$L(i, 2j - i + 1, 0; i, 2j - i, 1) =$$
$$L(i, 2j - i, 0; i + 1, 2j - i, 0) -$$
$$L(i + 1, 2j - i, 0; i, 2j - i, 1)$$

$$L(i, 2j - i - 1, 1; i + 1, 2j - i - 1, 1) +$$

-continued $$L(i+1, 2j-i-1, 1; i+1, 2j-i, 0) =$$
$$L(i, 2j-i-1, 1; i, 2j-i, 1) +$$
$$L(i, 2j-i, 1; i+1, 2j-i, 0) =$$
$$L(i, 2j-i-1, 1; i, 2j-i, 0) +$$
$$L(i, 2j-i, 0; i+1, 2j-i, 0) =$$
$$L(i, 2j-i-1, 1; i+1, 2j-i-1, 0) +$$
$$L(i+1, 2j-i-1, 0; i+1, 2j-i, 0)$$
$$L(i, 2j-i-1, 0; i+1, 2j-i-1, 0) +$$
$$L(i+1, 2j-i-1, 0; i, 2j-i-1, 1) =$$
$$L(i, 2j-i-1, 0; i, 2j-i, 0) +$$
$$L(i, 2j-i, 0; i, 2j-i-1, 1) =$$
$$L(i, 2j-i-1, 0; i-1, 2j-i-1, 1) +$$
$$L(i-1, 2j-i-1, 1; i, 2j-i-1, 1) =$$
$$L(i, 2j-i-1, 0; i, 2j-i-2, 1) +$$
$$L(i, 2j-i-2, 1; i, 2j-i-1, 1)$$

Figure 28:
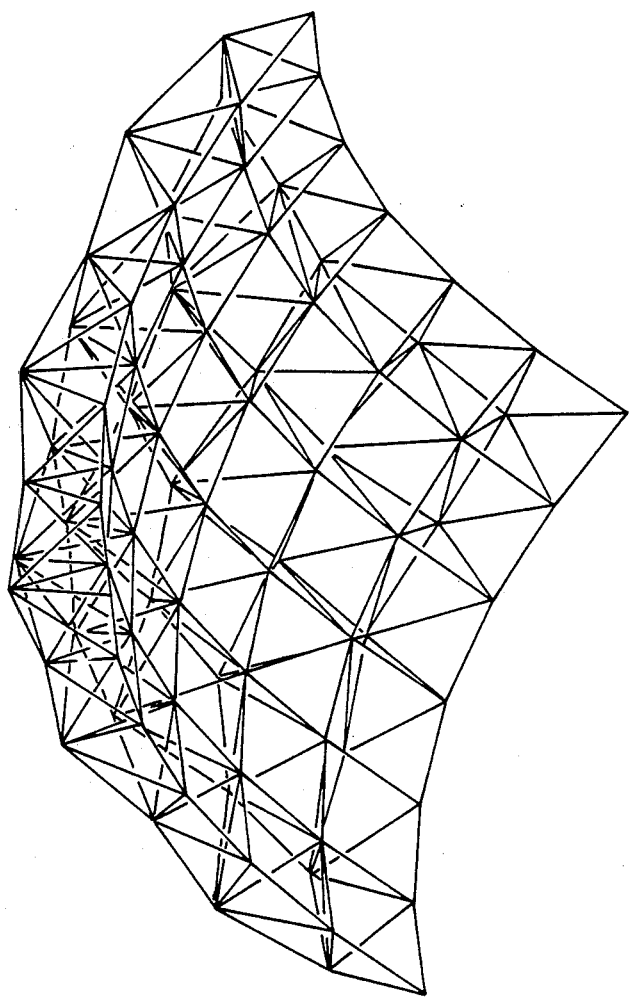
FIG. 28 is a perspective view of a three-dimensional truss structure in the form of a macroscopic curved surface obtained by modifying the fifth embodiment shown in FIGS. 23a-23c.

By varying the positions of the nodes of the deployable truss P shown as part in FIGS. 23a–23c while satisfying the aforesaid condition, it is possible to provide three-dimensional truss structures in the form of a macroscopic flat surface or curved surface which are each composed of pentahedral truss units or various configurations. For example, it is possible to provide three-dimensional truss structure in the form of a macroscopic curved surface of a curvature which is relatively small in a vertical direction or a horizontal direction or in both vertical and horizontal directions in FIG. 23a by slightly increasing the lengths $L(i, j, 0; i, j+1, 0)$ and $L(i, j, 0; i+1, j, 0)$ with regard to all i and j and by slightly increasing the lengths $L(i, j, 0; i, j, 1)$, $L(i, j, 0; i-1, j, 1)$, $L(i, j, 0; i, j-1, 1)$ and $L(i, j, 0; i-1, j-1, 1)$ with regard to all the i and j in which $i+j$ is an odd number and by adjusting the rest of the members so that the lengths of all the truss members satisfy the above-mentioned predetermined geometrical condition. Thus, it is possible to provide a three-dimensional truss structure in the form of a macroscopic curved surface as shown in FIG. 28.

In the deployable truss P shown in FIGS. 23a–23c, the truss members that can be shortened have been described as having their length reduced by bending each of them at the joint located in the middle of the respective truss member. However, the invention is not limited to this specific means for reducing the length of the truss memebers and any other means known in the art for reducing the length of the truss members may be used to allow the deployable truss to be folded by the same principle as described hereinabove in this specification.

Figure 29A:
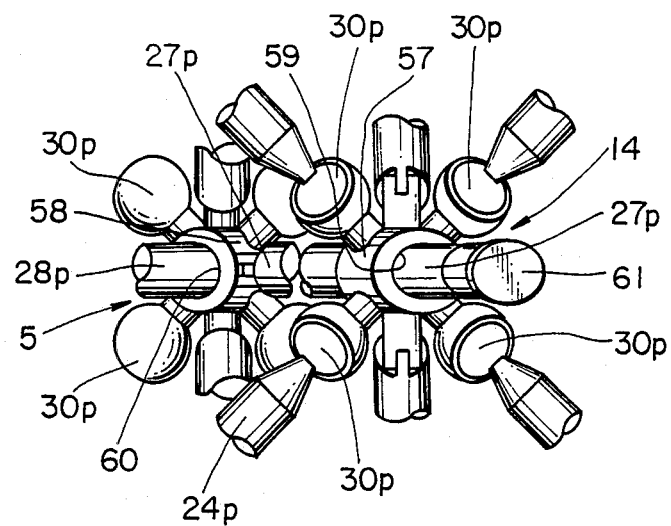
FIGS. 29a and 29b are a plan view and a front view, respectively, of the hinge block adapted to move in sliding movement on the truss members of the embodiment shown in FIGS. 23a-23c which provide contractable truss members.
Figure 29B:
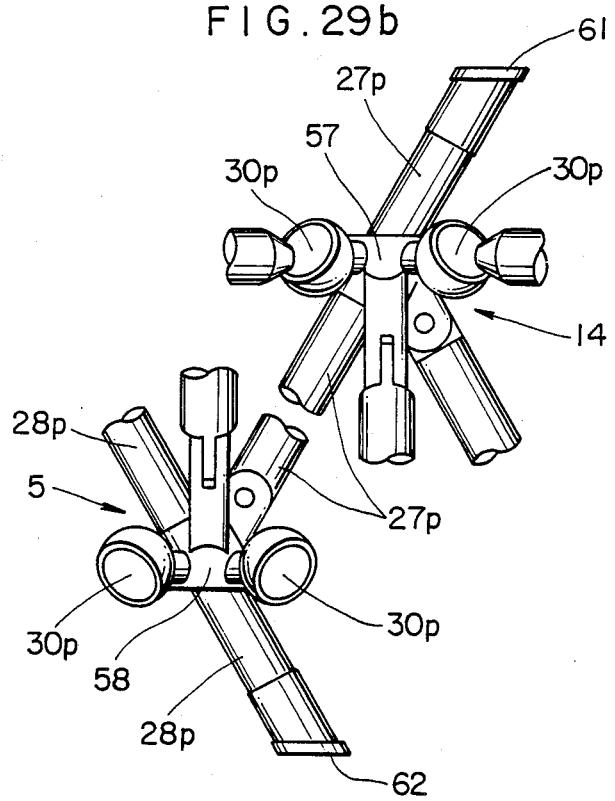

FIGS. 29a and 29b shown one example of another means for shortening the truss members wherein a truss member is slidably inserted in a hinge block which is able to move in sliding movement over the truss member so as to reduce the essential length of the truss member or the distance between the two nodes at the opposite ends of the truss member. In FIGS. 29a and 29b, there are shown the node 14 shown in FIG. 23a and hinge blocks 57 and 58 having truss members joined thereto. In these Figures, other truss members than those which are located in the front and rear surfaces of the deployed truss are relatively elongated, and the essential length of the truss members is slightly reduced as compared with the essential length they have when the truss is completely deployed. The hinge block 57 is formed with an axial center bore 59 to allow a truss member 27P to extend therethrough, and the hinge block 58 is formed with an axial center bore 60 to allow a truss member 28P to extend therethrough. The hinge blocks 57 and 58 move in sliding movement over the respective truss members 27P and 28P. The truss members 27P and 28P have stoppers 61 and 62, respectively, at their forward end, and locking means, not shown, are located between the hinge block 57 and truss member 27P and between the hinge block 58 and truss member 28P, respectively, to automatically lock the truss members in position when the truss is deployed. A gap between the truss member and hinge block only has to be eliminated when the truss has been deployed or when the hinge block has moved in sliding movement to the utmost end of the truss member. This facilitates the fabrication of the sliding hinge block.

From the foregoing description, assuming that a deployable truss is constructed which has nodes as denoted by the node denoting system described hereinabove and in which $i=0-N$, $j=0-M$ and $k=0-1$, it is necessary to bend $(4MN+2N+2M)$ truss members to fold the deployable truss by bending the truss members in the front and rear surfaces thereof in the same manner as has been done in the deployable GEO-TRUSS of the prior art. Meanwhile, in the deployable truss according to the invention, the deployable truss can be folded merely by elongating or shortening $(2MN+M+N+1)$ truss members. It will be apparent that the invention enables the number of the truss members that should be shortened, elongated or otherwise manipulated to fold a deployable truss to be reduced to about ½ the corresponding number in the prior art. Moreover, when an articulated joint is used for shortening a truss member, the number of truss members that are bent in the middle are about ½ the truss members that require manipulation, so that the truss members bent in the middle can be reduced in number to about ¼ the corresponding truss members in a truss that is folded by a process of the prior art. When a hinge block slidable over a truss member is used to shorten the truss member, the need to bend the truss members in the middle is eliminated. It will be seen that the features of the invention enable the problems of the prior art to be solved.

What is claimed is:

1. A deployable truss comprising:
   (a) a plurality of three-dimensional truss units;
   (b) each said three-dimensional truss unit including:
   a plurality of ridge members located in the position of ridges of an imaginary substantial hexahedron having a front face, a rear face and four side faces, those of said ridge members which are not located in the front face and rear face being able to be elongated;
   a plurality of side face diagonal members each located in the position of one of two diagonal lines of each side face of the hexahedron, said side face diagonal members being oriented such that each member is not parallel to the diagonal member in the opposed side face and is connected to the same vertex as the diagonal member in the adjacent side faces; and a front face diagonal member and a rear face diagonal member located in the position of one of two diagonal lines of the front face and in the position of one of the two diagonal lines of the rear face, respectively, and each having an articulated joint located in the intermediate position so as to be bendable;

(c) said three-dimensional truss units being oriented and joined together in such a manner that each unit shares with the adjacent unit one side face of the hexahedron and the ridge members and side face diagonal member of said one side face, and the side face diagonal members of each unit are in mirror-image relation to the corresponding members of the adjacent unit with respect to the shared one side face; and (d) said diagonal members and ridge members of each said three-dimensional truss unit being dimensioned such that the lengths thereof satisfy a predetermined geometrical condition which enables each unit to be folded and allows same to maintain the geometrical configuration, whereby the deployable truss can be folded to occupy a small space by bending the front face and rear face diagonal members and elongating the ridge members which are not located in the front face and rear face and can be deployed by straightening the bent diagonal members and restoring the elongated ridge members to the original length.

2. A deployable truss as claimed in claim 1, wherein said imaginary hexahedron based on which the configuration of said three-dimensional truss unit is determined is a rectangular parallelepiped, and the three-dimensional truss units are arranged in one macroscopic flat plane to provide a three-dimensional truss structure is the form of a macroscopic flat surface.

3. A deployable truss as claimed in claim 1, wherein said imaginary hexahedron based on which the configuration of said three-dimensional truss unit is determined as a perpendicular hexahedron in which the ridges and diagonal lines of smaller length of the front face and rear face are equal to each other in length so that the ridges and diagonal lines located therein constitute equilateral triangles, and the three-dimensional truss units are arranged in one macroscopic flat plane to provide a three-dimensional; truss structure in the form of a macroscopic flat surface.

4. A deployable truss as claimed in claim 3, wherein said imaginary hexahedron based on which the configuration of said three-dimensional truss unit is determined is an irregular hexahedron in which the ridges of the rear face are slightly greater in length than the ridges of the front face and the ridges not located in the front face and rear face include one of two pairs of opposed ridges slightly greater in length than the other pair of opposed ridges, the rest of the truss members are adjusted in length so that the lengths of all the truss members satisfy said predetermined geometrical condition, and the three-dimensional truss units are arranged in one macroscopic curved plane to provide a three-dimensional truss structure in the form of a macroscopical curved surface.

5. A deployable truss as claimed in claim 1, wherein the bendable front face and rear face diagonal members of each said three-dimensional truss unit are each replaced by two tension cords stretched in the position of the two diagonal lines, respectively.

6. A deployable truss as claimed in claim 1, wherein said three-dimensional truss units are arranged in a row to provide a three-dimensional truss structure in the form of a macroscopic straight or curved line.

* * * * *